(12) United States Patent
Hayashi et al.

(10) Patent No.: US 12,457,363 B2
(45) Date of Patent: Oct. 28, 2025

(54) IMAGE PROCESSING DEVICE AND METHOD

(71) Applicant: Sony Group Corporation, Tokyo (JP)

(72) Inventors: Kao Hayashi, Kanagawa (JP); Satoru Kuma, Tokyo (JP); Ohji Nakagami, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 264 days.

(21) Appl. No.: 18/029,587

(22) PCT Filed: Sep. 24, 2021

(86) PCT No.: PCT/JP2021/034950
§ 371 (c)(1),
(2) Date: Mar. 30, 2023

(87) PCT Pub. No.: WO2022/075078
PCT Pub. Date: Apr. 14, 2022

(65) Prior Publication Data
US 2023/0370636 A1 Nov. 16, 2023

(30) Foreign Application Priority Data

Oct. 6, 2020 (JP) .................................. 2020-169142

(51) Int. Cl.
*H04N 19/597* (2014.01)
*G06T 17/00* (2006.01)
(Continued)

(52) U.S. Cl.
CPC ........... *H04N 19/597* (2014.11); *G06T 17/00* (2013.01); *G06V 10/54* (2022.01); *H04N 19/46* (2014.11)

(58) Field of Classification Search
CPC ...... H04N 19/597; H04N 19/46; G06V 10/54; G06T 17/00
See application file for complete search history.

(56) References Cited

U.S. PATENT DOCUMENTS

2020/0302650 A1* 9/2020 Aksu ..................... G06T 9/001
2021/0174559 A1* 6/2021 Nakagami ............ G06T 11/003

FOREIGN PATENT DOCUMENTS

| JP | 2016-213808 A | 12/2016 |
| JP | 2019-153863 A | 9/2019 |
| WO | WO 2020/008758 A1 | 1/2020 |

OTHER PUBLICATIONS

Information technology—MPEG-I (Coded Representation of Immersive Media)—Part 9: Geometry-based Point Cloud Compression, ISO/IEC JTC 1/SC 29/WG 11, 2019, pp. 1-96.
(Continued)

*Primary Examiner* — Christopher S Kelley
(74) *Attorney, Agent, or Firm* — Paratus Law Group, PLLC

(57) ABSTRACT

There is provided an image processing device and a method that enables the number of attributes corresponding to a single geometry to be variable in a time direction. An attribute video frame that is a video frame in which a patch obtained by projecting each of a plurality of attributes to a two-dimensional plane for each partial region is arranged is generated, the plurality of attributes corresponding to a single geometry of a point cloud that expresses an object with a three-dimensional shape as a group of points, the generated attribute video frame for each attribute is coded, and attribute information that is information indicating the generated attribute video frames corresponding to the same timing is generated. The present disclosure can be applied to, (Continued)

for example, an image processing device, electronic equipment, an image processing method, a program, or the like.

8 Claims, 17 Drawing Sheets

(51) Int. Cl.
  *G06V 10/54* (2022.01)
  *H04N 19/46* (2014.01)

(56) References Cited

OTHER PUBLICATIONS

Mammou et al., Video-based and Hierarchical Approaches Point Cloud Compression, International Organization for Standardization, ISO/IEC JTC1/SC29/WG11, Oct. 2017, pp. 1-3, Macau, China.
Mammou, PCC Test Model Category 2 v0, International Organization for Standardization, ISO/IEC JTC1/SC29/WG11, Oct. 2017, pp. 1-11, Macau, China.
Krivokuca et al., 8i Voxelized Surface Light Field (8iVSLF) Dataset, International Organization for Standardization, ISO/IEC JTC1/SC29/WG11, Jul. 2018, pp. 1-8, Ljubljana, Slovenia.
Golla et al., Real-time Point Cloud Compression, IEEE, Sep. 2015, pp. 1-6.

* cited by examiner

IMAGE PROCESSING DEVICE AND METHOD

CROSS REFERENCE TO PRIOR APPLICATION

This application is a National Stage Patent Application of PCT International Patent Application No. PCT/JP2021/034950 (filed on Sep. 24, 2021) under 35 U.S.C. § 371, which claims priority to Japanese Patent Application No. 2020-169142 (filed on Oct. 6, 2020), which are all hereby incorporated by reference in their entirety.

TECHNICAL FIELD

The present disclosure relates to an image processing device and a method, and particularly to an image processing apparatus and a method in which the number of attributes corresponding to a single geometry is variable in a time direction.

BACKGROUND ART

In the related art, standardization of coding/decoding of point cloud data that expresses an object with a three-dimensional shape as a group of points has been advanced by the Moving Picture Experts Group (MPEG) (see NPL 1, for example).

Also, a method of projecting geometry data and attribute data of a point cloud to a two-dimensional plane for each small region, arranging an image (patch) projected to the two-dimensional plane within a frame image of a video, and coding the frame image by a coding method for a two-dimensional image (hereinafter, also referred to as a video-based approach) has been proposed (see NPL 2 to NPL 4, for example).

Furthermore, multiple attributes, which are a method of providing a plurality of attributes for a single geometry in the video-based approach, have been proposed (see NPL 5, for example). In the case of the method, each of the plurality of attributes is converted into a frame image and is then coded as described above.

In other words, frame images of the plurality of attributes are formed for each frame image of the geometry.

CITATION LIST

Non Patent Literature

[NPL 1]
"Information technology—MPEG-I (Coded Representation of Immersive Media)—Part 9: Geometry-based Point Cloud Compression", ISO/IEC 23090-9: 2019(E)

[NPL 2]
Tim Golla and Reinhard Klein, "Real-time Point Cloud Compression", IEEE, 2015

[NPL 3]
K. Mammou, "Video-based and Hierarchical Approaches Point Cloud Compression", MPEG m41649, October 2017

[NPL 4]
K. Mammou, "PCC Test Model Category 2 v0", N17248 MPEG output document, October 2017

[NPL 5]
Maja Krivoku. a, Philip A. Chou, and Patrick Savill, "8i Voxelized Surface Light Field (8iVSLF) Dataset", ISO/IEC JTC1/SC29/WG11 MPEG2018/m42914, July 2018, Ljubljana

SUMMARY

Technical Problem

However, in the case of the multiple attributes described in NPL 5, the number of attributes is fixed for all frames, and it is necessary to code all the attributes.

The present disclosure was made in view of such circumstances, and an object thereof is to make the number of attributes corresponding to a single geometry variable in a time direction.

Solution to Problem

An image processing device according to an aspect of the present technology is an image processing device including an attribute video frame generation unit that generates an attribute video frame that is a video frame in which a patch obtained by projecting each of a plurality of attributes to a two-dimensional plane for each partial region is arranged for each of the plurality of attributes corresponding to a single geometry of a point cloud that expresses an object with a three-dimensional shape as a group of points; an attribute video frame coding unit that codes the attribute video frame of each attribute that has been generated by the attribute video frame generation unit; and an attribute information generation unit that generates attribute information that is information indicating the attribute video frames which have been generated by the attribute video frame generation unit and correspond to mutually the same timing.

An image processing method according to an aspect of the present technology is an image processing method including: generating an attribute video frame that is a video frame in which a patch obtained by projecting each of a plurality of attributes to a two-dimensional plane for each partial region is arranged for each of the plurality of attributes corresponding to a single geometry of a point cloud that expresses an object with a three-dimensional shape as a group of points; coding the generated attribute video frame of each attribute; and generating attribute information that is information indicating the generated attribute video frames corresponding to mutually the same timing.

An image processing device according to another aspect of the present technology is an image processing device including: an attribute video frame decoding unit that decodes coded data and generates an attribute video frame that is a video frame in which a patch obtained by projecting each of a plurality of attributes to a two-dimensional plane for each partial region is arranged, the attribute video frame corresponding to each of the plurality of attributes corresponding to a single geometry of a point cloud that expresses an object with a three-dimensional shape as a group of points; an attribute information decoding unit that decodes the coded data and generates attribute information that is information indicating attribute video frames mutually corresponding to the same timing; and a point cloud generation unit that generates the point cloud on the basis of the attributes included in the attribute video frames generated by the attribute video frame decoding unit and the attribute information generated by the attribute information decoding unit.

An image processing method according to another aspect of the present technology is an image processing method comprising: decoding coded data and generating an attribute video frame that is a video frame in which a patch obtained by projecting each of a plurality of attributes to a two-dimensional plane for each partial region is arranged, the attribute video frame corresponding to each of the plurality of attributes corresponding to a single geometry of a point cloud that expresses an object with a three-dimensional shape as a group of points; decoding the coded data and generating attribute information that is information indicating the attribute video frames mutually corresponding to the same timing; and generating the point cloud on the basis of the attributes included in the generated attribute video frames and the generated attribute information.

In the image processing device and the method according to an aspect of the present technology, an attribute video frame that is a video frame in which a patch obtained by projecting each of a plurality of attributes to a two-dimensional plane for each partial region is arranged is generated, the plurality of attributes corresponding to a single geometry of a point cloud that expresses an object with a three-dimensional shape as a group of points, the generated attribute video frame of each attribute is coded, and attribute information that is information indicating the generated attribute video fames corresponding to the same timing is generated.

In the image processing device and the method according to another aspect of the present technology, coded data is decoded and an attribute video frame that is a video frame in which a patch obtained by projecting each of a plurality of attributes to a two-dimensional plane for each partial region is arranged is generated, the plurality of attributes corresponding to a single geometry of a point cloud that expresses an object with a three-dimensional shape as a group of points, coded data is decoded and attribute information that is information indicating the attribute video frames mutually corresponding to the same timing is generated, and a point cloud is generated on the basis of the attributes included in the generated attribute video frames and the generated attribute information.

DESCRIPTION OF EMBODIMENTS

Figure 1:
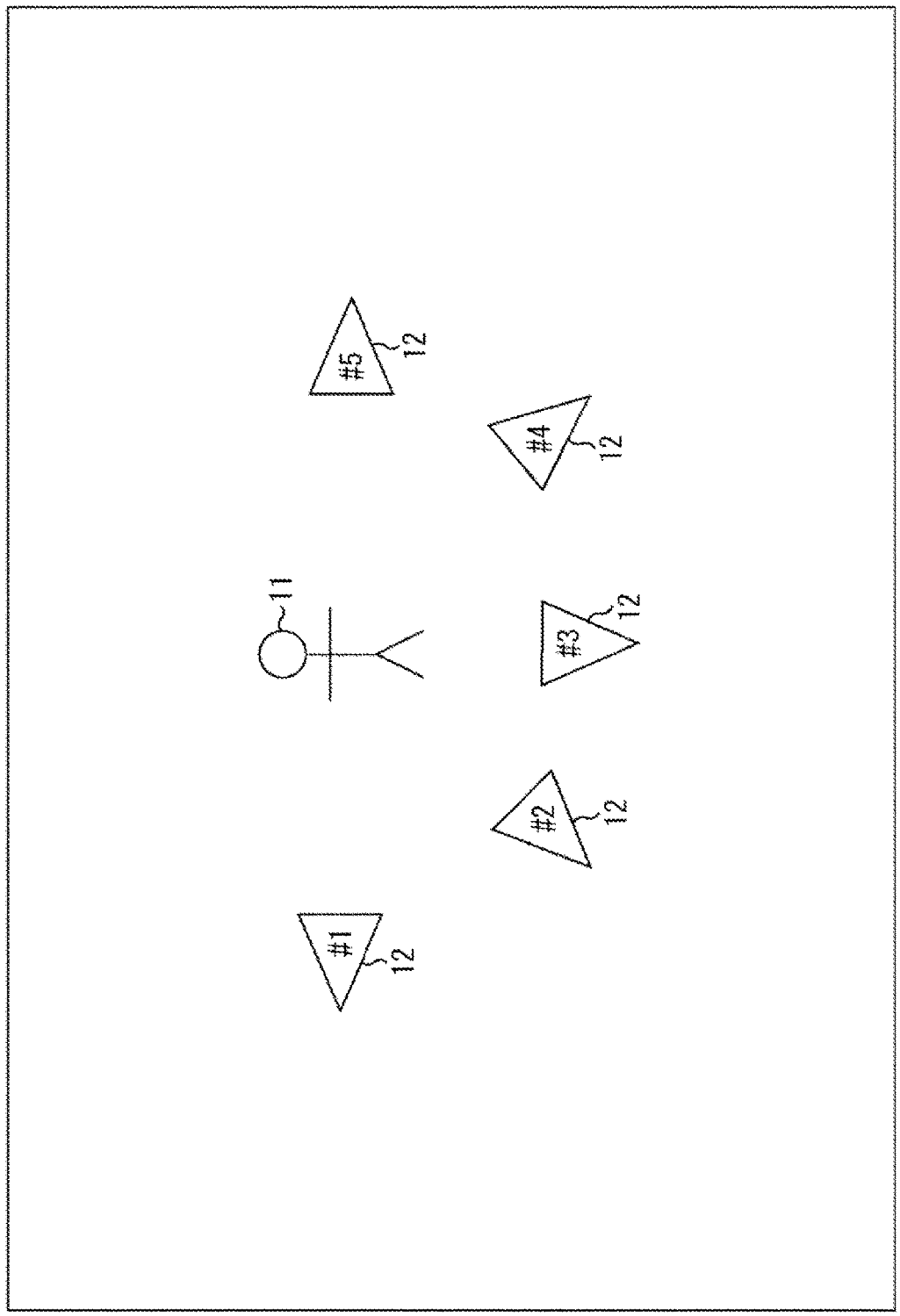
FIG. 1 is a diagram for explaining multiple attributes.

Hereinafter, modes for carrying out the present disclosure (hereinafter, referred to as embodiments) will be described. The description will be given in the following order.
1. Adaptive multiple attributes
2. First embodiment (coding device)
3. Second embodiment (decoding device)
4. Supplement <1. Adaptive Multiple Attributes>
<Documents that Support Technical Content and Terms>

The scope disclosed in the present technology is not limited to the content described in the embodiments and also includes the content described in the following non patent literature and the like that were known at the time of filing, the content of other literature referred to in the following non patent literature, and the like.

NPL 1: (described above)
NPL 2: (described above)
NPL 3: (described above)
NPL 4: (described above)
NPL 5: (described above)

In other words, the content described in the above non patent literature, content of other literature referred to in the above non patent literature, and the like are also grounds for determining support requirements.

<Point Cloud>

In the related art, 3D data such as a point cloud representing a three-dimensional structure by point position information, attribute information, or the like is present.

In a case of a point cloud, for example, a stereoscopic structure (an object with a three-dimensional shape) is expressed as a group of multiple points. The point cloud is constituted by position information of each point (also referred to as a geometry) and attribute information (also referred to as an attribute). The attribute can include arbitrary information. For example, color information, reflectance information, normal line information, and the like of each point may be included in the attribute. In this manner, according to the point cloud, a data structure is relatively simple, and it is possible to express an arbitrary stereoscopic structure with sufficient accuracy by using a sufficiently large number of points.

<Quantizing Positional Information Using Voxel>

Since data of such a point cloud (also referred to as point cloud data) has a relatively large data amount, a coding method using voxels has thus been considered in order to compress the data amount through coding or the like. The voxels are three-dimensional regions for quantizing a geometry (position information).

In other words, a three-dimensional region (also referred to as a bounding box) including a point cloud is split into small three-dimensional regions called voxels, and whether or not a point is included is indicated for each voxel. In this manner, the position of each point is quantized in units of voxels. Therefore, it is possible to suppress an increase in the amount of information (typically, reduce the amount of information) by converting point cloud data into data of such voxels (also referred to as voxel data).

<Outline of Video-Based Approach>

In a video-based approach, a geometry and an attribute of such a point cloud are projected to a two-dimensional plane for each small region (connection component). In the present disclosure, the small region may be referred to as a partial region. An image in which the geometry and the attribute are projected to the two-dimensional plane will also be referred to as a projection image. Also, the projection image for each small region (partial region) will be referred to as a patch. For example, position information of a point in the projection image (patch) of the geometry is expressed as position information (depth value (Depth)) in the vertical direction (depth direction) with respect to the projection plane.

Additionally, each patch generated in this manner is arranged in a frame image of a video sequence (also referred to as a video frame). A frame image in which patches of a geometry are arranged will also be referred to as a geometry video frame. Also, a frame image in which patches of an attribute are arranged will also be referred to as an attribute video frame. For example, each pixel value of a geometry video frame indicates the aforementioned depth value.

Then, these video frames are coded by a coding method for a two-dimensional image, such as Advanced Video Coding (AVC) or High Efficiency Video Coding (HEVC), for example. In other words, point cloud data that is 3D data representing a three-dimensional structure can be coded using a codec for a two-dimensional image.

<Occupancy Map>

Note that in the case of such a video-based approach, it is also possible to use an occupancy map. The occupancy map is map information indicating presence/absence of a projection image (patch) for each of N×N pixels of a geometry video frame or an attribute video frame. For example, the occupancy map indicates, by a value "1", a region (N×N pixels) where patches are present and indicates, by a value "0", a region (N×N pixels) where no patches are present of the geometry video frame or the attribute video frame.

Such an occupancy map is coded as data that is different from the geometry video frame or the attribute video frame and is then transmitted to a decoding side. Since a decoder can recognize whether patches are present in the region with reference to the occupancy map, it is possible to suppress influences of noise and the like generated by coding/decoding and to more accurately restore 3D data. Even if a depth value changes due to coding/decoding, for example, the decoder can ignore a depth value (not process it as position information of the 3D data) in the region where no patches are present with reference to the occupancy map.

Note that the occupancy map can also be transmitted as a video frame similarly to the geometry video frame, the attribute video frame, and the like.

<Auxiliary Patch Information>

Furthermore, in the case of the video-based approach, information regarding patches (also referred to as auxiliary patch information) is transmitted as metadata.

<Moving Image>

Note that in the following description, (an object) of a point cloud can change in a time direction like a moving image of a two-dimensional image. In other words, geometry data and attribute data are assumed to include a concept of the time direction and are assumed to be data sampled for each predetermined period of time like a moving image of a two-dimensional image. Note that data at each sampling clock time will be referred to as a frame like a video frame of a two-dimensional image. In other words, each item of point cloud data (geometry data and attribute data) is assumed to be constituted by a plurality of frames like a moving image of a two-dimensional image. In the present disclosure, the frames of the point cloud will also be referred to as point cloud frames. In the case of the video-based approach, it is possible to highly efficiently code even such a point cloud of a moving image (a plurality of frames) using a moving image coding scheme by obtaining a video sequence through conversion of each point cloud frame into a video frame.

<Multiple Attributes>

In NPL 5, multiple attributes which are a method of providing a plurality of attributes for a single geometry in such a video-based approach is disclosed. It is possible to select a more appropriate attribute at the time of rendering, to generate a more appropriate attribute using the plurality of attributes, and to suppress degradation of subjective image quality of a displayed image, for example, by associating the plurality of attributes to the single geometry.

As illustrated in FIG. 1, for example, it is assumed that cameras 12 image an object 11 which is an imaging target and an attribute of a point cloud of the object 11 is generated using a texture of the object obtained from the captured images. One geometry of the point cloud of the object 11 is generated since the geometry is position information of each point. On the other hand, since the number of cameras 12 are five (#1 to #5), five captured images are obtained. In such a case, if a texture of the object 11 (a picture pattern, a color, brightness, surface quality, and the like of the surface of the object 11) included in each of the captured images is assumed to be an independent attribute, five attributes are generated for the one geometry. As illustrated in FIG. 1, the positions and the directions of the five cameras 12 are different from each other. Typically, how (the texture of) the object 11 is seen can differ depending on the position and the direction of a point of view. Therefore, the textures of the attribute can be different from each other.

It is possible to select a texture from a point of view closer in position and direction at the time of rendering, to generate a more appropriate texture using the plurality of textures, and to suppress degradation of subjective image quality of the displayed image, by associating the textures obtained from the plurality of points of view with the single geometry in this manner.

Figure 2:
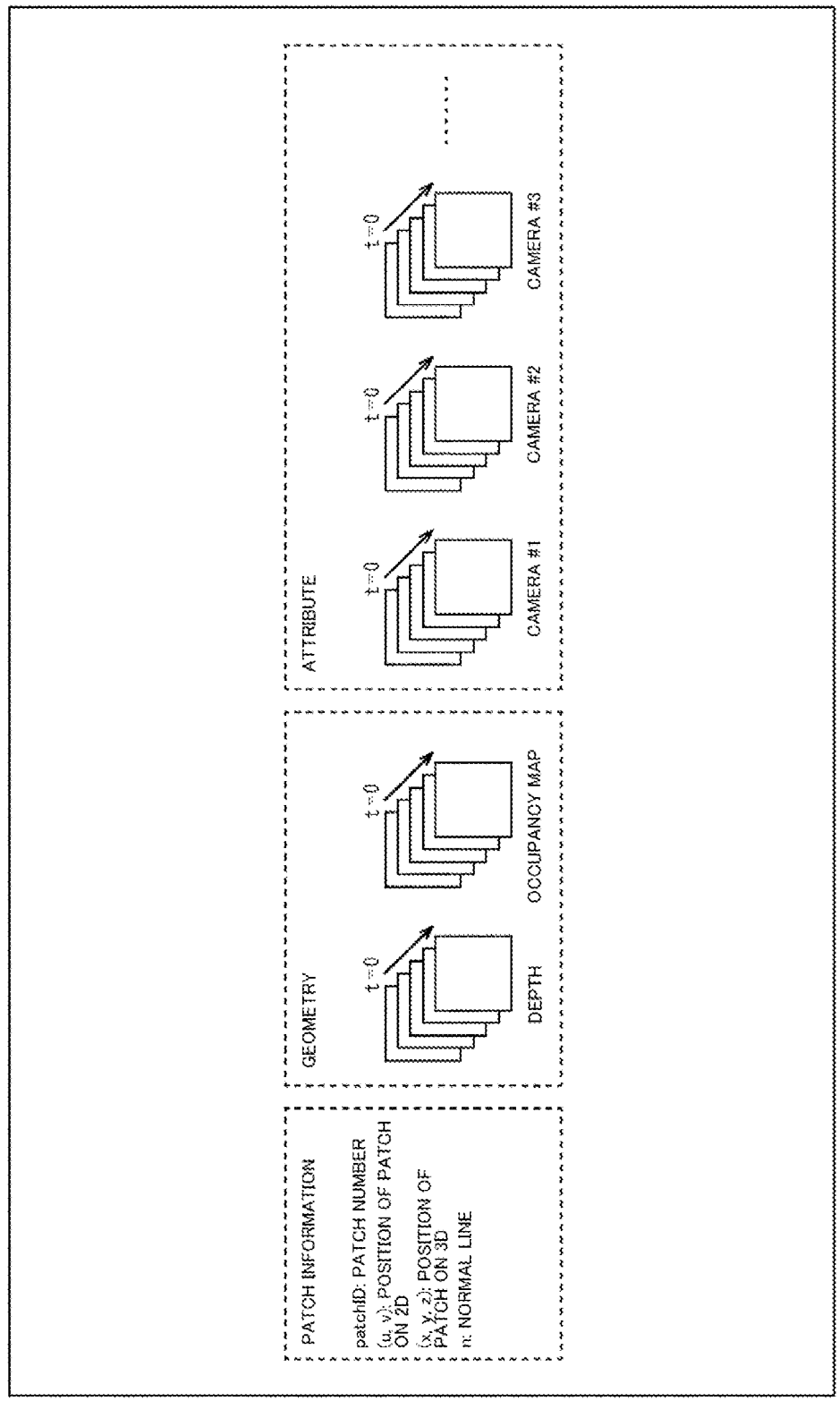
FIG. 2 is a diagram for explaining multiple attributes.

In a case where such multiple attributes are applied in the video-based approach, an attribute video frame is generated by each camera (that is, for each attribute) as illustrated in FIG. 2. Therefore, patch information (auxiliary patch information), a single geometry video frame (depth), an occupancy map, and a plurality of attribute video frames are coded as illustrated in FIG. 2. For each point cloud frame, such a video frame and auxiliary patch information are generated.

Note that as illustrated in FIG. 2, the patch information includes information such as patch identification information (patchID), the position (u0, v0) of a patch on a 2D projection plane (a two-dimensional plane to which connection components (small regions) of a point cloud are projected), the position (u, v, d) of the projection plane in a three-dimensional space, a normal line (n), and the like. Furthermore, information such as a patch width (width), a patch height (height), and the like may be included in the patch information.

However, in the case of the multiple attributes described in NPL 5, the number of attributes is fixed in all the point cloud frames, and it is necessary to code the attribute video frames of all the attributes. For example, even if it is necessary to code only the attribute video frames surrounded by circles and it is not necessary to code the attribute video frames with x marks applied thereto from among all the attributes as illustrated in A in FIG. 3, it is necessary to code all the frames (that is, all the attribute video frames) of all the attributes. Therefore, even if it is not necessary to code some of attribute video frames as in A in FIG. 3, for example, it is necessary to code the unnecessary attribute video frames as well. Therefore, there is a concern that the amount of data to be coded increases and the amount of coding increases.

If the amount of coding increases, there is a concern that this leads not only to an increase in loads of coding processing and decoding processing but also to an increase in load when coded data is transmitted and stored (a load of a transmission medium, a storage medium, and the like). There is thus a concern that cost for a device and a system related to the video-based approach increases.

<Variable Number of Attributes>

Thus, the number of attributes corresponding to a single geometry is made to be variable in the time direction. In other words, an increase and a decrease in number of attributes to be coded (that is, the number of attribute video frames mutually corresponding to the same timing) are enabled as needed. In other words, the number of attributes (attribute video frames) corresponding to each point cloud frame may not be unified (may not be the same) in this case.

Figure 3:
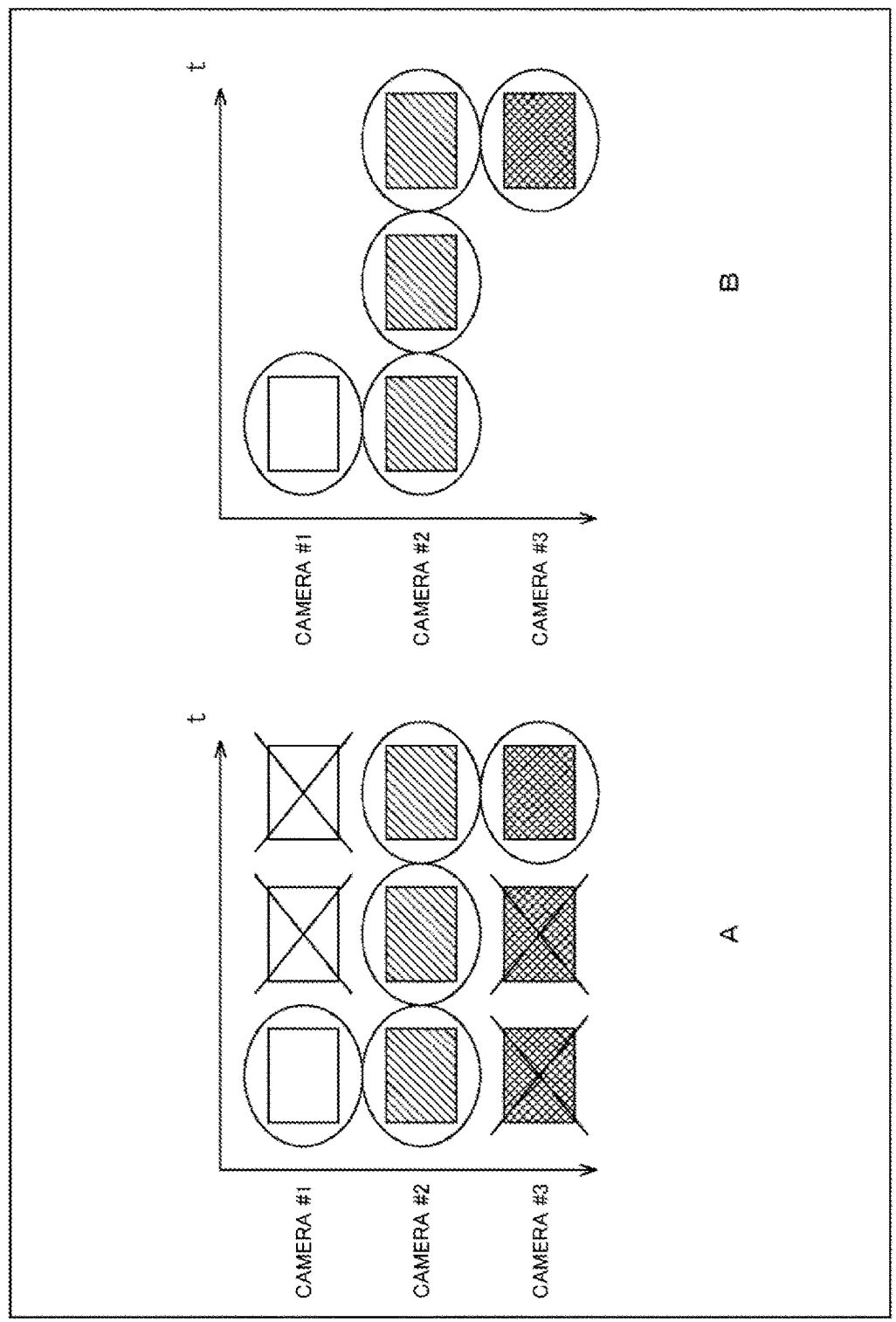
FIG. 3 is a diagram for explaining adaptive multiple attributes.

For example, coding of only necessary attribute video frames surrounded by the circles is enabled as illustrated in B of FIG. 3. In other words, unnecessary attribute frames that are not present in B of FIG. 3 are not coded. In this manner, it is possible to omit the coding of the attribute video frames of the unnecessary attributes, to thereby suppress an increase in amount of data to be coded, and to suppress an increase in amount of coding.

Note that in the present disclosure, the attributes are assumed to include textures (the picture patterns, the color, the brightness, the surface quality, and the like of the surface of the object) of the object with the three-dimensional shape. Also, the textures of the object included in each of the plurality of captured images obtained by a plurality of cameras through image capturing are assumed to be associated as multiple attributes with one geometry of the object. In other words, the plurality of attributes corresponding to the single geometry as multiple attributes are assumed to include the textures of the object included in the captured images obtained by the cameras placed at mutually different locations in different directions through image capturing.

In other words, the captured images corresponding to the attributes have mutually different angles of view. The positions and the directions of the cameras will also be referred to as "points of view" for viewing the object. In other words, the plurality of attributes corresponding to the single geometry as the multiple attributes are assumed to include textures of the object obtained at mutually different points of view.

Next, an example of a method of making the number of attributes variable will be described.

Example 1 in which Number of Attributes is Variable

Figure 4:
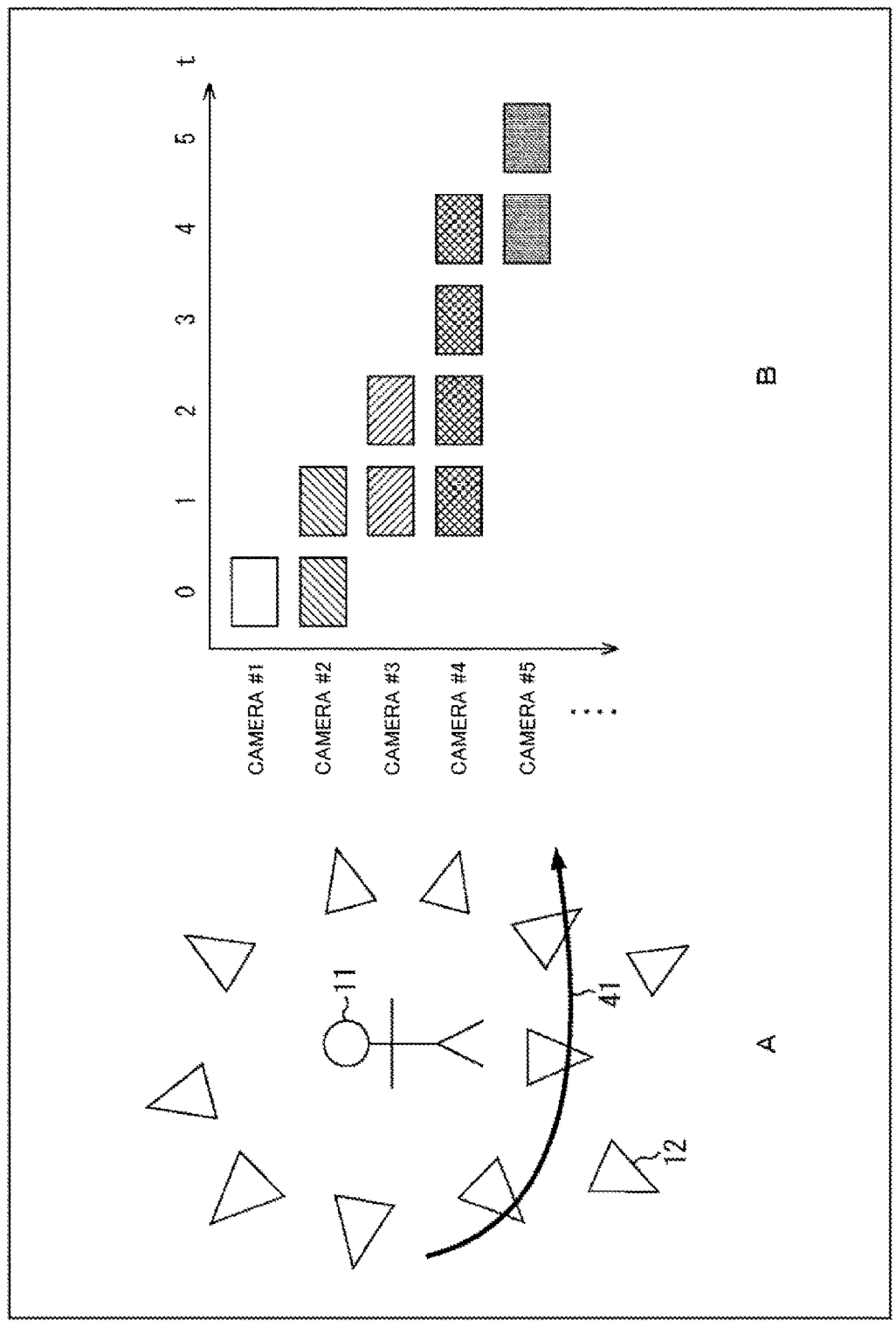
FIG. 4 is a diagram for explaining an example of a change in the number of attributes.

For example, a user or the like may select attribute video frames to be coded. For example, it is assumed that an object 11 is imaged by a plurality of cameras 12 and attributes are generated using textures of the object 11 obtained from each of the captured images as illustrated in A of FIG. 4. In this case, it is assumed that the point of view at the time of rendering moves like the arrow 41 along a time axis. In other words, it is assumed that motion of the point of view (also referred to as a point-of-view path) at the time of the rendering like the arrow 41 is known.

In such a case, it is necessary to code the attribute video frames of all the attributes regardless of the positions of the points of view according to the method described in NPL 5. Therefore, there is a concern that the amount of coding may increase.

Thus, the user or the like may select some of the attributes (cameras) in accordance with the point-of-view path, and the encoder may encode only the attribute video frames of the selected attributes in such a case. In other words, the selected attribute video frames of each point cloud frame may be coded, and coding of the attribute video frames that have not been selected may be omitted (skipped). As illustrated in B of FIG. 4, for example, cameras that are close to the point-of-view position at that time may be sequentially selected for each point cloud frame t, and attribute video frames of the attributes corresponding to the selected cameras may be generated and coded.

For example, the position View(t) of the point of view at the clock time t which is a timing of a point cloud frame is indicated using the x coordinate (Xview(t)), the y coordinate (Yview(t)), and the z coordinate (Zview(t)) at the clock time t as follows.

$$\text{View}(t) = (\text{Xview}(t), \text{Yview}(t), \text{Zview}(t))$$

The location Cam(k) (k=1, . . . , K) of each camera 12 is indicated using the x coordinate (Xcam(k)), the y coordinate (Ycam(k)), and the z coordinate (Zcam(k)) as follows.

$$\text{Cam}(k) = (\text{Xcam}(k), \text{Ycam}(k), \text{Zcam}(k))$$

A set of necessary cameras at each clock time is selected on the basis of View(t) and Cam(k). In a case where View(t) and Cam(k) are sufficiently close to each other, for example, the cameras (attributes) are selected. Then, attribute video frames of the attributes corresponding to the selected cameras are coded.

In this manner, it is possible to appropriately increase/decrease the number of attributes to be coded (the number of attribute video frames to be coded corresponding to mutually the same timing) as needed. In other words, it is possible to omit the coding of unnecessary attribute video frames and thereby to suppress an increase in amount of coding.

For example, the likelihood that attributes corresponding to cameras located far from the point of view are used at the time of rendering is low. Although there is a concern that subjective image quality of the display image may be reduced if the coding of the attribute video frames necessary for the rendering is omitted, it is possible to suppress influences on the subjective image quality of the display image even if the coding of the attribute video frames with less necessities is omitted in this manner. In other words, it is possible to suppress an increase in amount of coding while suppressing degradation of subjective image quality of the displayed image by omitting the coding of the attribute video frames corresponding to the cameras located far from the point of view as described above.

Example 2 in which Number of Attributes is Variable

There may originally be a case where attribute video frames of all attributes are not prepared. In such a case, the attribute video frames may be coded without interpolation.

Figure 5:
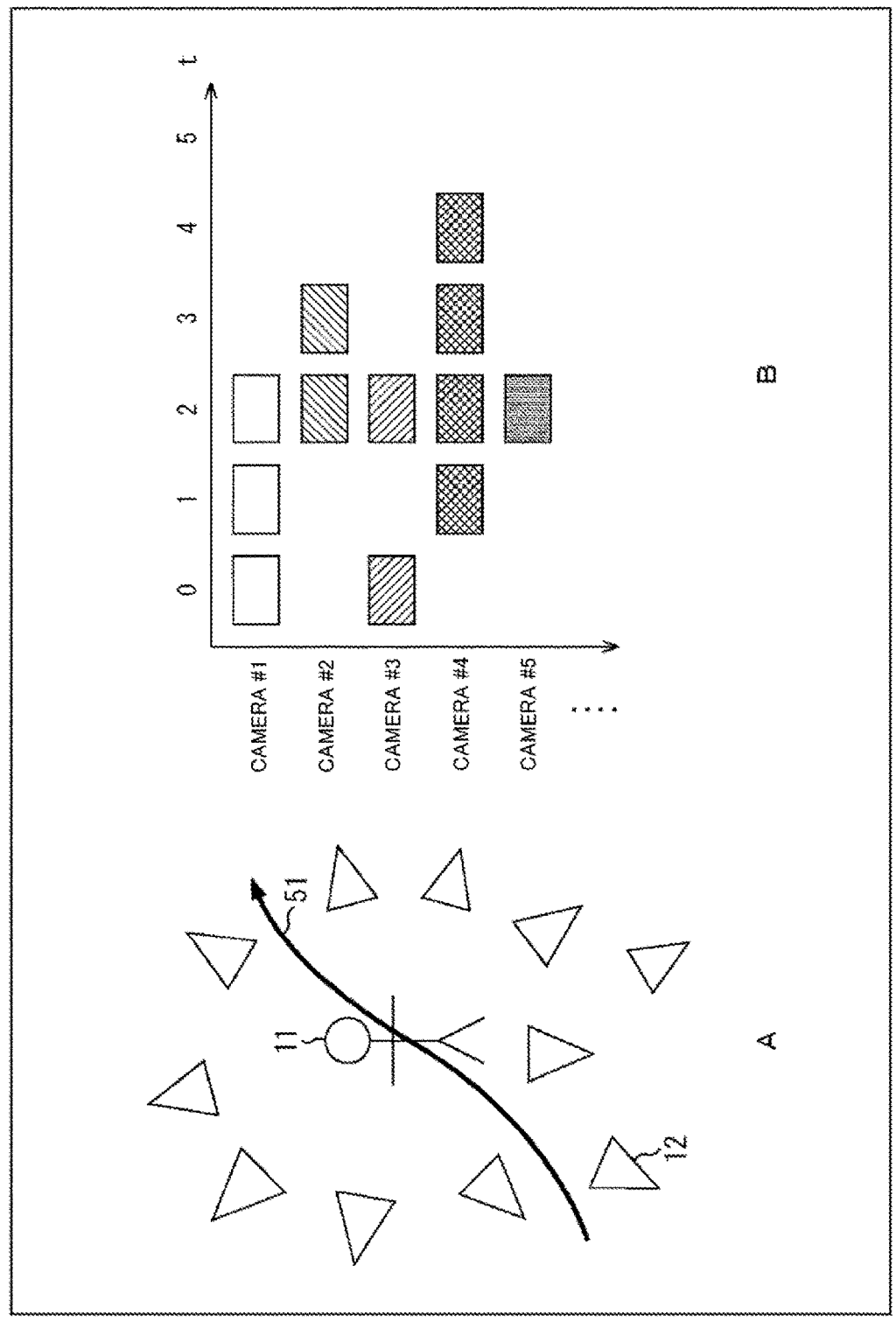
FIG. 5 is a diagram for explaining an example of a change in the number of attributes.

As illustrated in A of FIG. 5, for example, it is assumed that an object 11 is imaged by a plurality of cameras 12 and attributes are generated using textures of the object 11 obtained from each of the captured images. Also, it is assumed that the object 11 moves like the arrow 51 along the time axis. In such a case, the number of cameras 12 capable of imaging the object 11 may be different depending on the position of the object 11. In other words, the number of cameras 12 capable of imaging the object 11 may change in response to movement of the object 11 as illustrated in B of FIG. 5. In other words, the number of attribute video frames may change along the time axis. In the case of the example in B of FIG. 5, all the attribute video frames are prepared at the clock time t=2 which is the timing of the point cloud frame while all the attribute video frames are not prepared at the other clock times t.

In such a case, according to the method described in NPL 5, it is necessary to prepare all the attribute video frames, attribute video frames of attributes that are not present in the point cloud frame are thus interpolated, and coding is then performed. Therefore, there is a concern that the amount of coding may increase.

Thus, the encoder may code the attribute video frames of the attributes that are not present in the point cloud frame without interpolation in such a case. In other words, the encoder may code only the attribute video frames of the attributes that are present in the point cloud frame for each point cloud frame. In other words, the encoder may code the attribute video frames of the attributes that are present in the point cloud frame and may omit (skip) coding of the attribute video frames of the attribute that are not present for each point cloud frame.

In this manner, it is possible to appropriately increase/decrease the number of attributes to be coded (the number of attribute video frames to be coded corresponding to mutually the same timing) as needed. In other words, it is possible to omit the coding of unnecessary attribute video frames and thereby to suppress an increase in amount of coding.

Note that the phrase that the attribute video frames are not present means that the object 11 cannot be seen from the positions and the directions of the cameras 12 at the timing of the point cloud frame. Therefore, the likelihood that the vicinity of the cameras 12 is used as a point of view for viewing the object 11 at the timing of the rendering is low. In other words, the likelihood that the interpolated attribute video frames are necessary at the time of rendering is low. Although there is a concern that subjective image quality of the display image may be reduced if the coding of the attribute video frames necessary for the rendering is omitted, it is possible to suppress influences on the subjective image quality of the display image even if the coding of the attribute video frames with less necessities is omitted in this manner. In other words, it is possible to suppress an increase in amount of coding while suppressing degradation of subjective image quality of the displayed image by performing the coding without interpolating the attribute video frames that are not present as described above.

Example 3 in which Number of Attributes is Variable

For example, the coding unit that codes the point cloud may adaptively select attributes (attribute video frames) to suppress an increase in amount of coding. For example, the coding unit may derive a difference between attributes (a difference between cameras) or a difference between an average of all the attributes (all the cameras) and an attribute as a target of processing, and in a case where the difference is sufficiently small, the coding may omit the coding of the attribute video frame.

In this manner, it is possible to appropriately increase/decrease the number of attributes to be coded (the number of attribute video frames to be coded corresponding to the timing at the mutually same clock time) as needed. In other words, it is possible to omit the coding of unnecessary attribute video frames and thereby to suppress an increase in amount of coding.

Note that the aforementioned phrase that the difference is sufficiently small means that similarity with the other attributes is high, and even if the attribute is used instead on the side of decoding, an influence on rendering is small. In other words, it is possible to suppress influences on subjective image quality of the displayed image. In other words, it is possible to suppress an increase in amount of coding while suppressing degradation of subjective image quality of the displayed image by omitting the coding of the attribute video frames with sufficiently small differences from the other attributes or from the average of the attributes as described above.

<Base Attribute>

Note that a base attribute (attribute video frame) may be coded, and another separate stream may be generated, for example. The base attribute may be, for example, an average of all the attributes (cameras) or an attribute constituted by predetermined attributes (representative cameras) or the like.

In a case where the base attribute is coded and is then transmitted as another separate stream from the coding side to the decoding side in this manner, the number of attributes to be coded at each frame clock time may be zero.

<Attribute Information>

If the number of attributes is made to be variable in the time direction in the video-based approach to which multiple attributes are applied as described above, it is difficult to ascertain which of the attribute video frames has been coded on the side of the decoding. Therefore, there is a concern that it may be difficult for the encoder to accurately decode such coded data. In other words, there is a concern that it may be difficult to realize a variable number of attributes in the time direction in the video-based approach to which multiple attributes are applied.

Thus, attribute information that is information regarding coded attributes (attribute video frames) is signaled (transmitted from the coding side to the decoding side).

For example, an attribute video frame that is a video frame in which a patch obtained by projecting each of a plurality of attributes to a two-dimensional plane for each partial region is arranged is generated for each of the plurality of attributes corresponding to a single geometry of a point cloud that expresses an object with a three-dimensional shape as a group of points, the generated attribute video frame of each attribute is coded, and attribute information which is information indicating the generated attribute video frames corresponding to mutually the same timings is generated.

Also, an image processing device includes: for example, an attribute video frame generation unit that generates an attribute video frame that is a video frame in which a patch obtained by projecting each of a plurality of attributes to a two-dimensional plane for each partial region is arranged for each of the plurality of attributes corresponding to a single geometry of a point cloud that expresses an object with a three-dimensional shape as a group of points; an attribute video frame coding unit that codes the attribute video frame of each attribute generated by the attribute video frame generation unit; and an attribute information generation unit that generates attribute information that is information indicating the attribute video frames that have been generated by the attribute video frame generation unit and correspond to mutually the same timings.

Furthermore, coded data is decoded and an attribute video frame that is a video frame in which a patch obtained by projecting each of a plurality of attributes to a two-dimensional plane for each partial region is arranged is generated, the attribute video frame corresponding to each of the plurality of attributes corresponding to a single geometry of a point cloud that expresses an object with a three-dimensional shape as a group of points, coded data is decoded and attribute information that is information indicating the attribute video frames corresponding to mutually the same timing is generated, and a point cloud is generated on the basis of the attributes included in the generated attribute video frames and the generated attribute information, for example.

Also, an image processing device includes, for example: an attribute video frame decoding unit that decodes coded data and generates an attribute video frame that is a video frame in which a patch obtained by projecting each of a plurality of attributes to a two-dimensional plane for each partial region is arranged, the attribute video frame corresponding to each of the plurality of attributes corresponding to a single geometry of a point cloud that expresses an object with a three-dimensional shape as a group of points; an attribute information decoding unit that decodes coded data and generates attribute information that is information indicating the attribute video frames corresponding to mutually the same timing; and a point cloud generation unit that generates a point cloud on the basis of the attributes included in the attribute video frames generated by the attribute video frame decoding unit and the attribute information generated by the attribute information decoding unit.

It is possible for the decoder to easily recognize which of the attribute video frames have been coded by signaling the attribute information as described above. In other words, even in a case where the number of attributes is made to be variable in the time direction in the video-based approach to which multiple attributes are applied, the decoder can accurately decode coded data. In other words, it is possible to realize a variable number of attributes in the time direction in the video-based approach to which multiple attributes are applied.

Note that the attribute information may be any information as long as it is possible to recognize the coded attribute on the decoding side.

For example, the attribute information may include a list of attributes that are present in each point cloud frame. For example, it is assumed that an attribute video frame of each attribute is present as in A of FIG. 6. Attribute information 61 as illustrated in B of FIG. 6 may be signaled for such attribute data.

Figure 6:
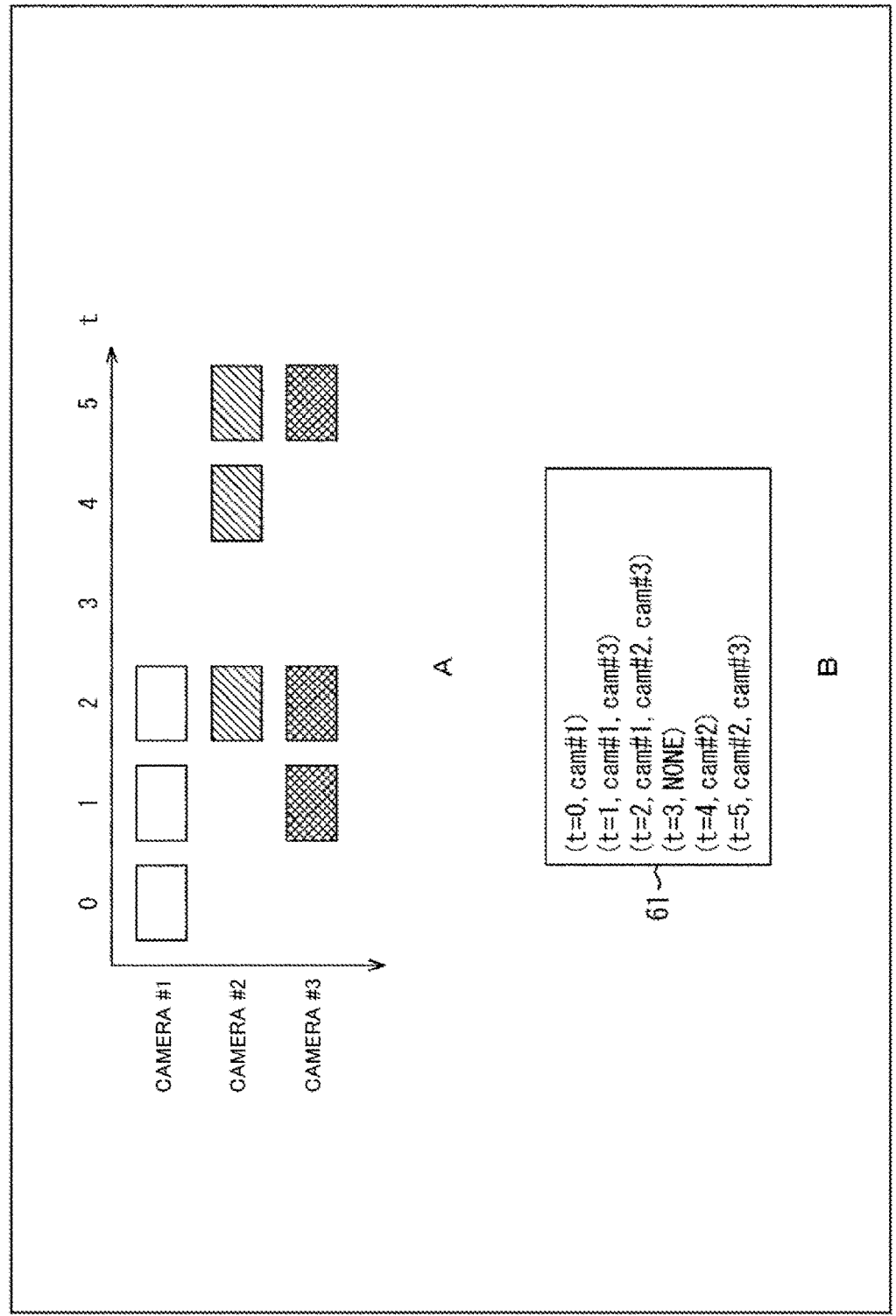
FIG. 6 is a diagram for explaining an example of attribute information.

As illustrated in B of FIG. 6, identification information of attributes (cameras) that are present in a point cloud frame is indicated for each point cloud frame (at a clock time of the point cloud frame) in the attribute information 61. For example, it indicates that there is an attribute (cam #1) in the point cloud frame at the frame clock time t=0. In other words, the attribute video frame of the attribute (cam #1) is coded as the attribute of the point cloud frame (t=0).

Also, it indicates that there are an attribute (cam #1) and an attribute (cam #3) in the point cloud frame at the frame clock time t=1. In other words, the attribute video frames of the attribute (cam #1) and the attribute (cam #3) are coded as attributes of the point cloud frame (t=1).

Moreover, it indicates that there are an attribute (cam #1), an attribute (cam #2), and an attribute (cam #3) in the point cloud frame at the frame clock time t=2. In other words, the attribute video frames of the attribute (cam #1), the attribute (cam #2), and the attribute (cam #3) are coded as attribute of the point cloud frame (t=2).

Also, it indicates that there are no attributes in the point cloud frame at the frame clock time t=3. In other words, there are no attribute frames coded as attributes of the point cloud frame (t=3) (NONE).

Furthermore, it indicates that there is an attribute (cam #2) in the point cloud frame at the frame clock time t=4. In other words, the attribute video frame of the attribute (cam #2) is coded as an attribute of the point cloud frame (t=4).

Also, it indicates that there are an attribute (cam #2) and an attribute (cam #3) in the point cloud frame at the frame clock time t=5. In other words, the attribute video frames of the attribute (cam #2) and the attribute (cam #3) are coded as attributes of the point cloud frame (t=5).

It is possible to easily recognize the coded attribute video frames by referring to such attribute information. Additionally, it is possible to associate the coded attributes with a geometry and an occupancy map at the same timing using the point cloud frames.

Also, the attribute information may include a list of attributes that are not present in each point cloud frame, for example. Similarly to the example in B of FIG. 6, for example, the attribute information may include a list of identification information of attributes (cameras) that are not present in the point cloud frame for each point cloud frame. It is possible to recognize the attributes that are present as well by recognizing the attributes that are not present. Therefore, it is possible to easily recognize the coded attribute video frames from the attribute information in this case as well similarly to the case of the example in B of FIG. 6.

In a case where the number of attribute video frames to be coded is larger than the number of attribute video frames that are not to be coded, for example, it is possible to suppress an increase in information amount of attribute information by applying the list of the attributes that are not to be coded in this manner. In other words, in a case where the number of attribute video frames that are not to be coded is larger than the number of attribute video frames to be coded, it is possible to suppress an increase in information amount of attribute information by applying the list of the attributes to be coded.

Also, the attribute information may be generated for each point cloud frame or may be generated only for some of the point cloud frames. For example, in a case where attributes that are present (attributes, the attribute video frames of which have been coded) have changed as compared with a previous point cloud frame, attribute information corresponding to the point cloud frame may be generated. In a case where the attributes that are present have not changed, generation of the attribute information corresponding to the point cloud frame may be omitted.

At that time, the attribute information may include information regarding all the attribute coded (or not coded) at the frame clock time as in the example in B of FIG. 6. Also, the attribute information may include information regarding difference between attributes from the previous point cloud frame. In other words, only attributes with changed statuses regarding whether or not the attributes have been coded may be listed. In this manner, it is possible to suppress (typically, reduce) an increase in amount of data of the attribute information in a case where a change in attributes in the time direction is small.

<Processing on Decoding Side>

It is possible to easily recognize whether which of the attributes the attribute video frames have been coded for, on the basis of the attribute information on the decoding side. An arbitrary method may be used as a method of processing the attributes on the decoding side in a case where the attribute video frames for all the attributes have not been prepared as described above.

Figure 7:
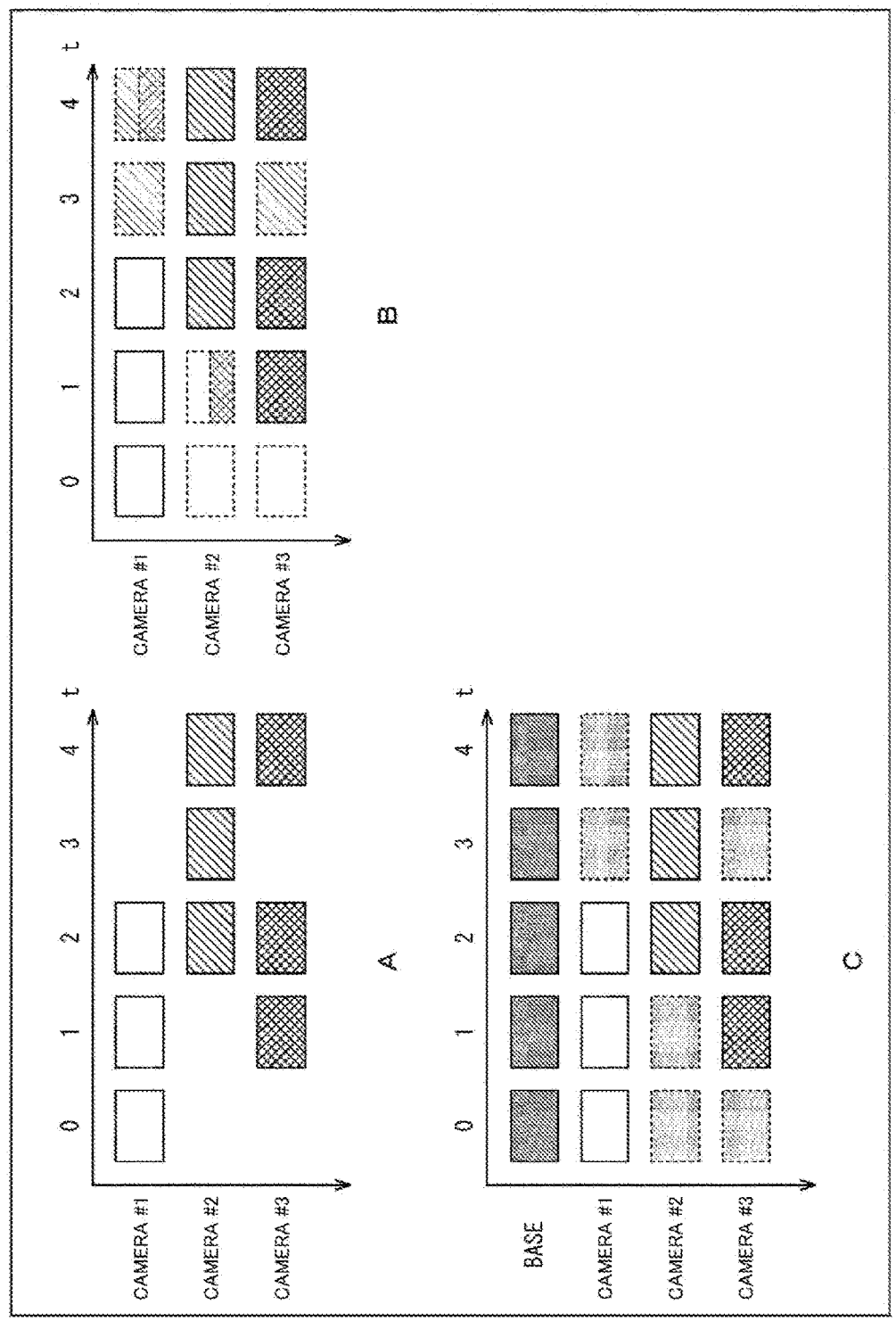
FIG. 7 is a diagram for explaining an example of interpolation of attributes.

As illustrated in A of FIG. 7, for example, a point cloud may be generated using attributes in a state where all the attribute video frames have not been prepared. In other words, the point cloud may be generated without performing interpolation of the attribute video frames that are not present after decoding.

Also, the attribute video frames that are not present after decoding may be interpolated using attribute video frames of other attributes. As illustrated in B of FIG. 7, for example, replacement with an average or a weighted average of all the attributes that are present after decoding and correspond to the same point cloud frame as that of the attribute video frames that are not present after decoding may be performed. Also, replacement with an attribute video frame of an attribute that corresponds to the same point cloud frame as that of the attribute video frames that are not present after decoding and that has the closest camera position to those of the attribute video frames that are not present after decoding may be performed. Furthermore, replacement with an average or a weighted average of a plurality of attributes that correspond to the same point cloud frame as that of the attribute video frames that are not present after decoding and that have sufficiently close camera positions as those of the attribute video frames that are not present after decoding may be performed. Also, replacement with a base attribute corresponding to the same point cloud frame as that of the attribute video frames that are not present after decoding may be performed as illustrated in C of FIG. 7.

<Coding for Each Attribute>

Figure 8:
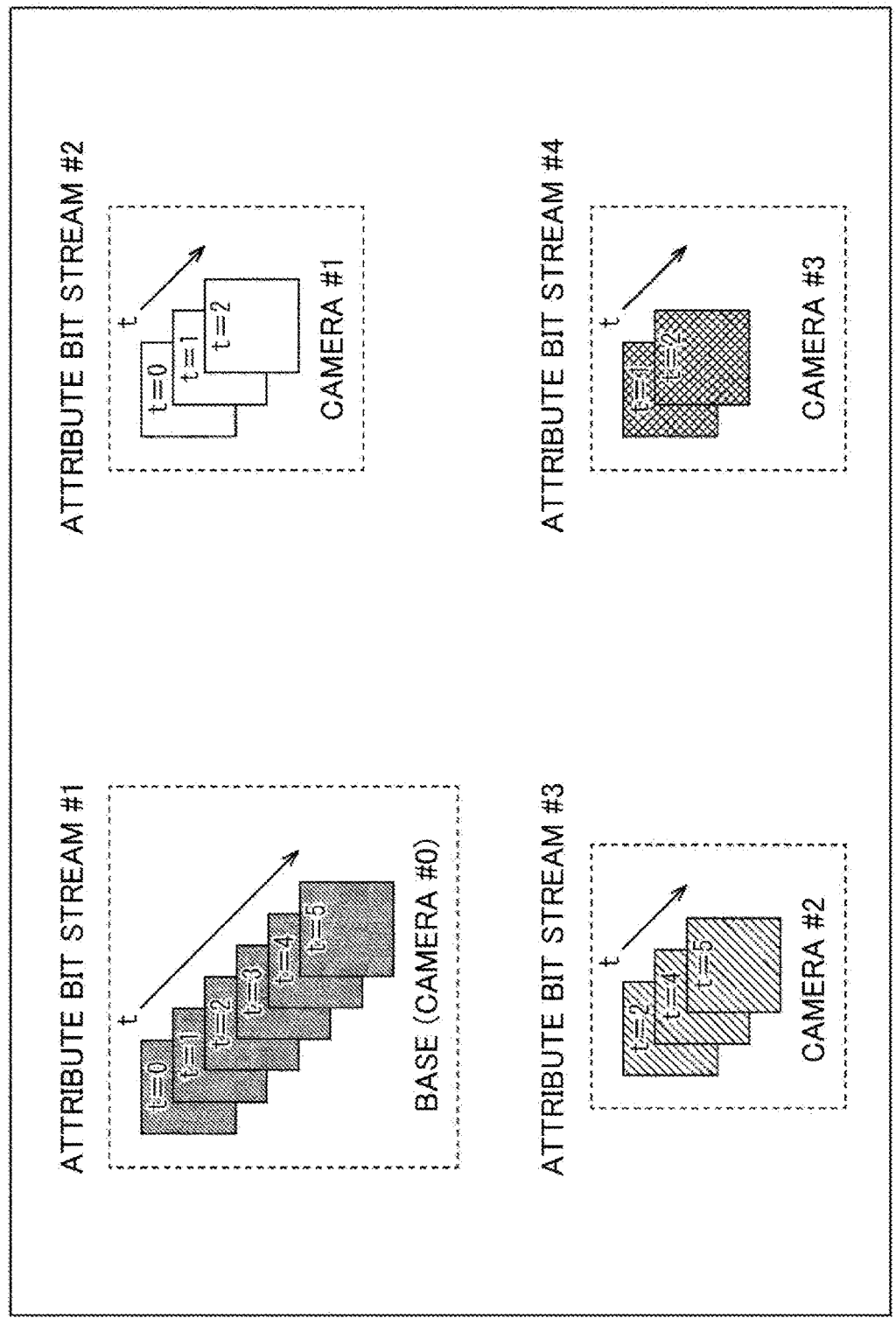
FIG. 8 is a diagram illustrating a configuration example of a bit stream of an attribute.

As in the example of FIG. 8, for example, the attribute video frame of each attribute may be coded as a video sequence for each attribute to thereby generate coded data for each attribute.

In this case, a reference relationship used for the coding is limited to the inside of the attributes (correlations among the cameras are not used for the coding). Also, as in the example illustrated in FIG. 8, the base attribute may be coded as one video sequence in addition to the attribute of each camera to thereby generate coded data of the base attribute. In such a case, identification information (camera IDs or the like) may be applied to the base attribute and the base coded data.

In this case, the attributes are associated on the basis of the camera IDs at each clock time t included in the attribute information and the camera ID of each bit stream.

<Coding of all Attributes>

Figure 9:
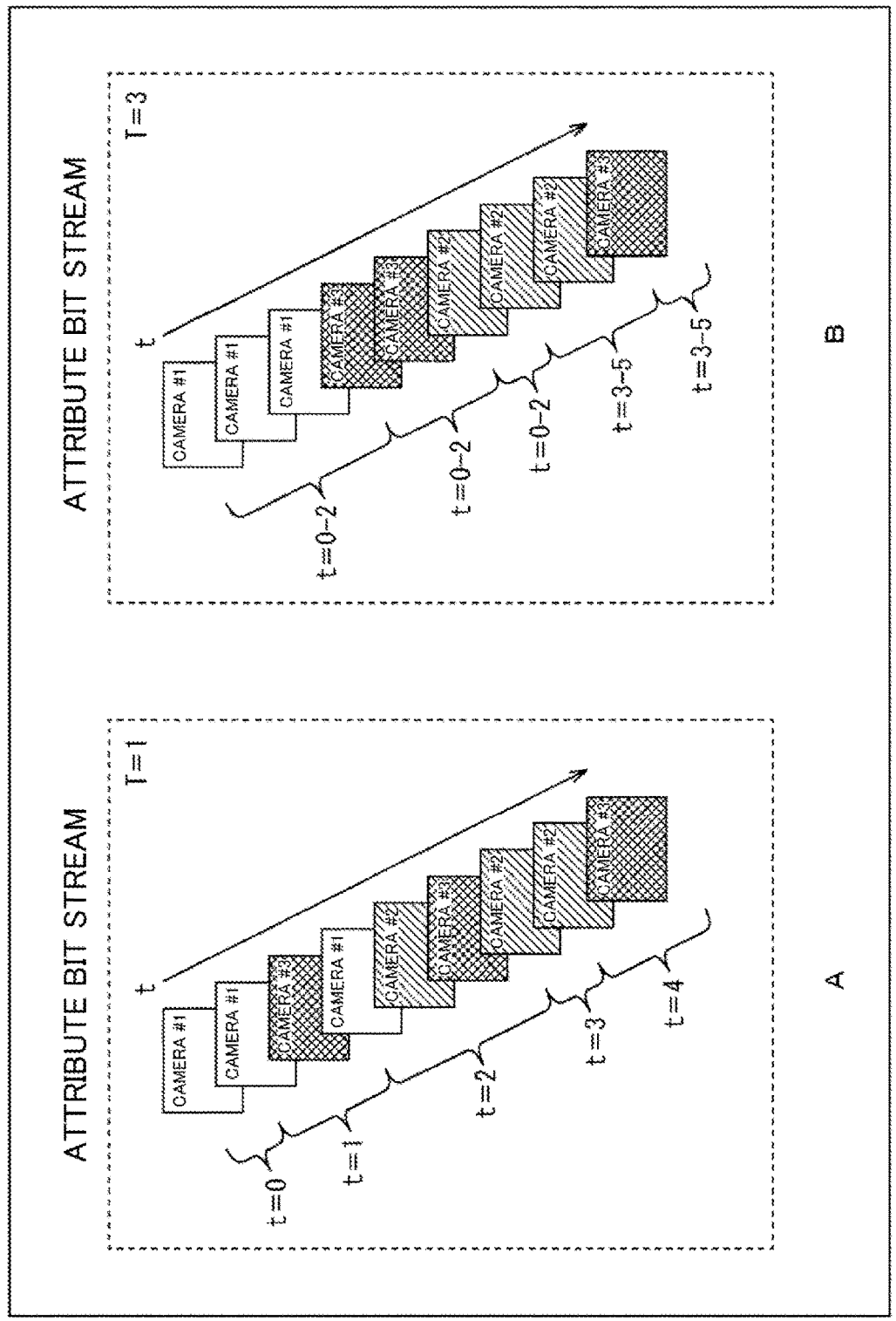
FIG. 9 is a diagram illustrating a configuration example of a bit stream of an attribute.

Also, the attribute video frames of all the attributes may be coded as a single video sequence to thereby generate coded data including all the attributes as in the example in FIG. 9.

In this case, the correlations among the cameras can be used for the coding. Note that the base attribute may be further included as one video sequence and coding may be performed thereon.

In a case where coded data including all the attributes is generated in this manner, the attribute video frame of each attribute may be interleaved at a predetermined interval and may then be coded. In the case of A of FIG. 9, for example, interleaving is performed at the interleaving interval T=1. In other words, the attribute video frame of each attribute is interleaved at each frame clock time. On the other hand, in the case of B of FIG. 9, interleaving is performed at the interleaving interval T=3. In other words, the attribute video frame of each attribute is interleaved at each three-frame clock time.

Note that the interleaving interval may be determined in advance or may be variable. Also, the interleaving interval T which is a parameter indicating the interleaving interval may be signaled. For example, the value of the interleaving interval T may be included in the attribute information.

Also, in a case where the coded data including all the attributes is generated as described above, the frame order within each clock time t may be aligned in the order of the camera IDs indicated by the attribute information. In this manner, it is possible to easily recognize the frame order at each clock time t as well on the basis of the attribute information.

<Reference Structure Example 1>

Figure 10:
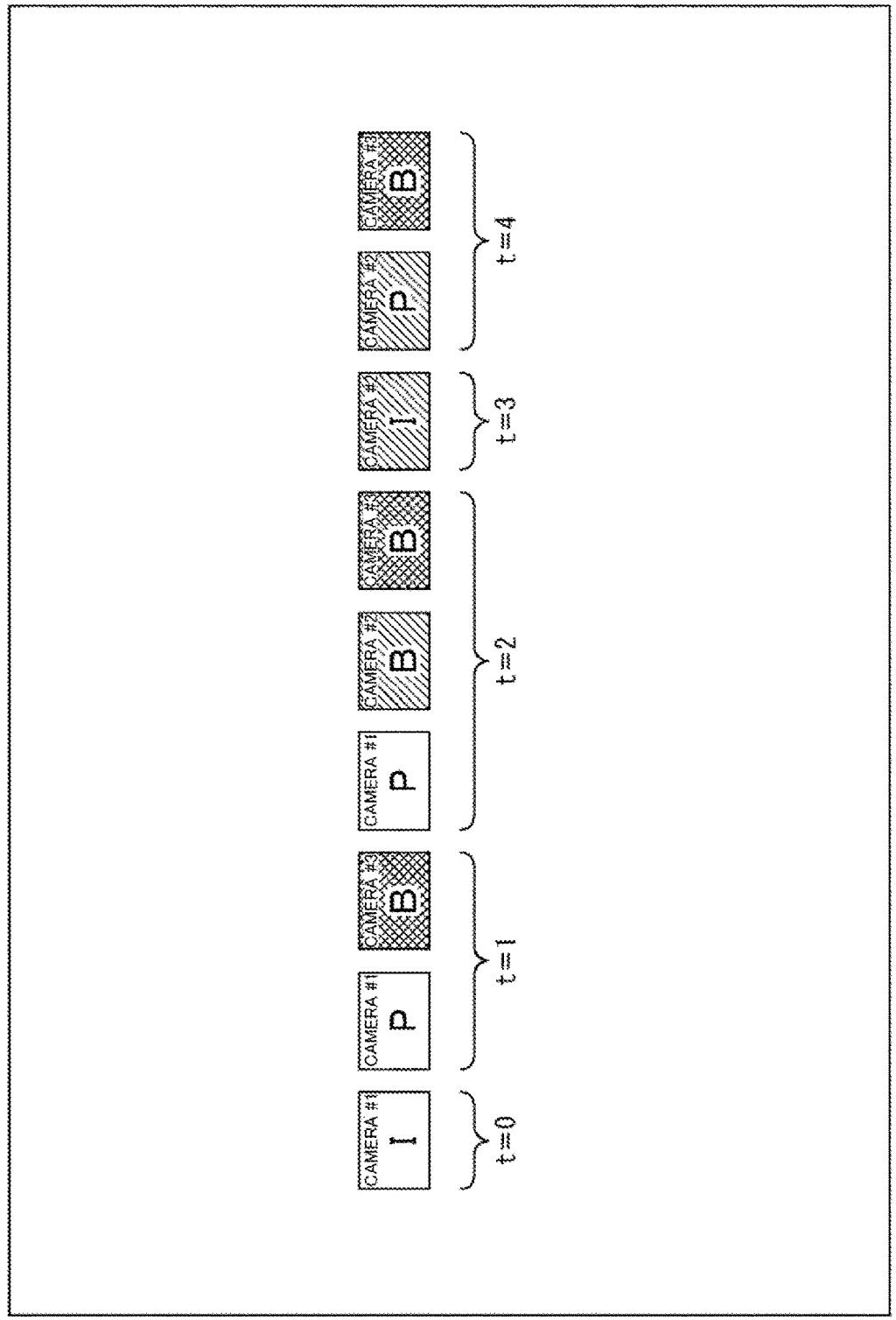
FIG. 10 is a diagram illustrating an example of interleaving.

A reference structure among frames in a case where attribute video frames of all attributes are coded as one video sequence to thereby generate coded data including all the attributes is an arbitrary structure. As in the example in FIG. 10, for example, an I picture, a P picture, and a B picture may be set. In this case, one picture is defined as an I picture or a P picture at each frame clock time, and the other pictures are defined as B pictures. In this manner, it is possible to use the reference among cameras and time reference in the coding. Accordingly, it is possible to suppress degradation of coding efficiency. Note that if it is desired to decode only one attribute at each clock time in this case, skip decoding may be selected to skip decoding of the B pictures.

Figure 11:
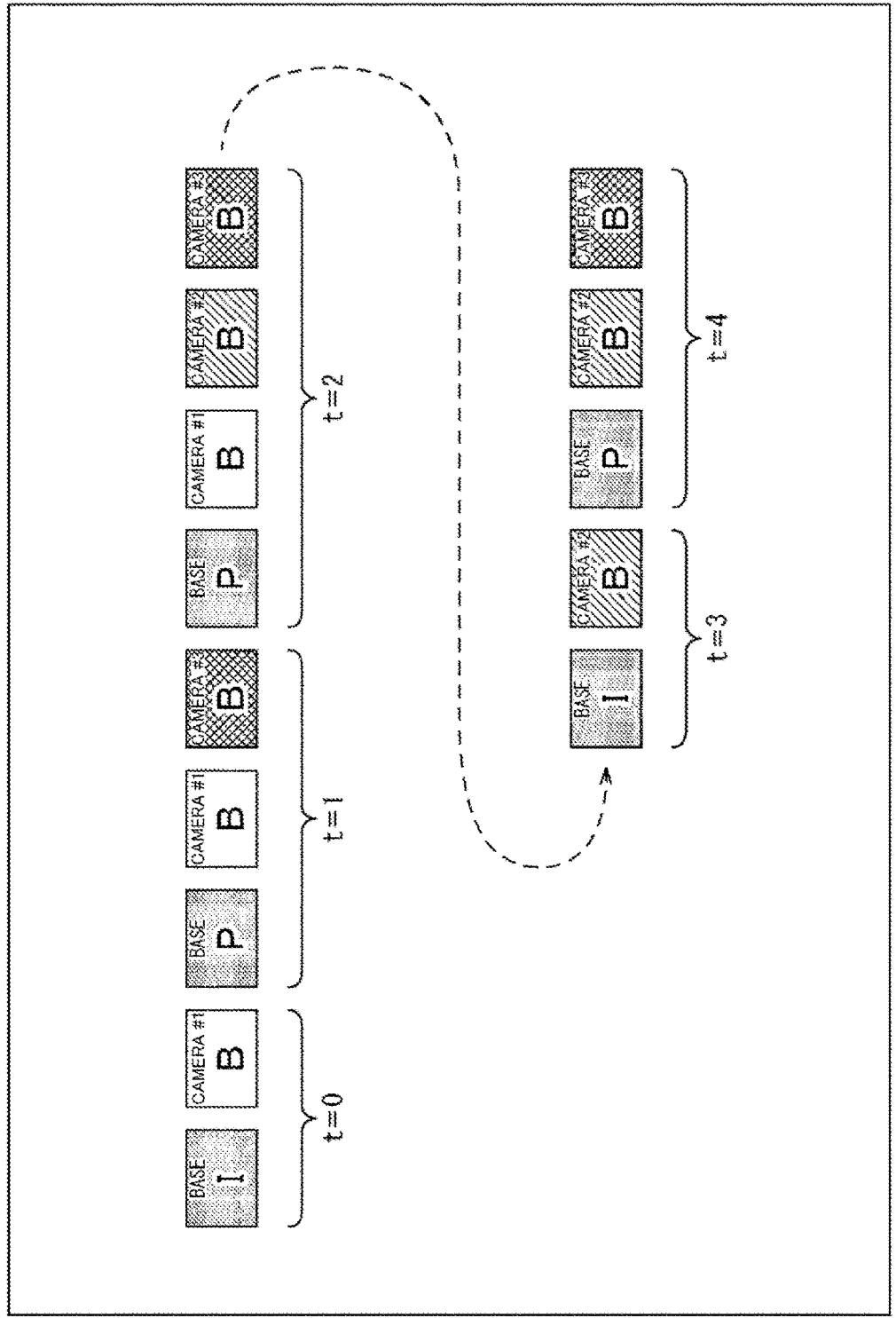
FIG. 11 is a diagram illustrating an example of interleaving.

In a case where the base attribute video frame is also included as in the example in FIG. 11, the base attribute video frame may be defined as an I picture or a P picture, and the attribute video frames of the other attributes may be defined as B pictures. Similarly to the example in FIG. 10, one picture is defined as an I picture or a P picture at each frame clock time, and the other pictures are defined as B pictures in this case as well. In this manner, it is possible to use reference among cameras and time reference in the coding similarly to the case in FIG. 10. Accordingly, it is possible to suppress degradation of coding efficiency. Note that in this case, it is possible to decode only the base attribute video frame by selecting the skip decoding and skipping the decoding of the B pictures.

Figure 12:
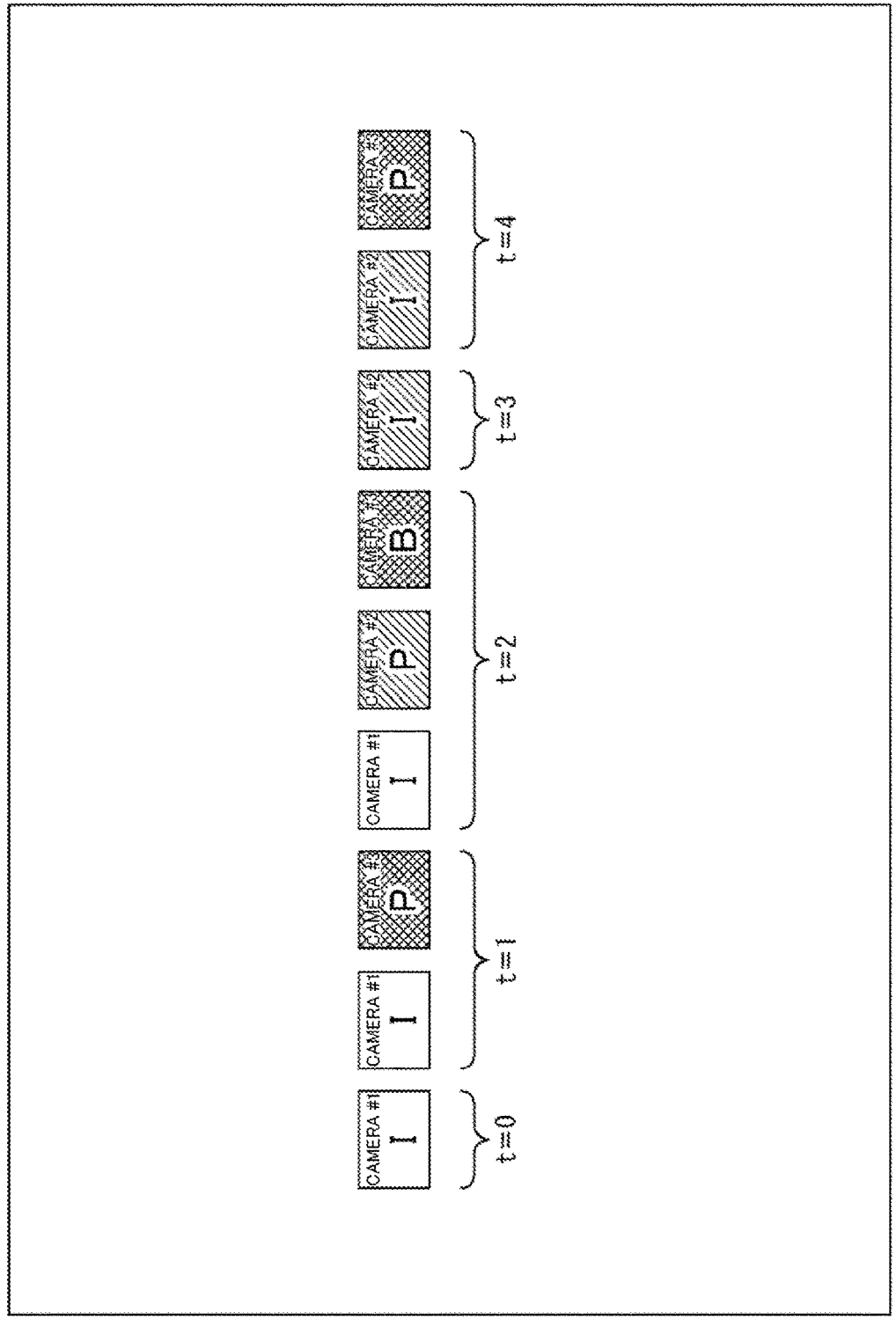
FIG. 12 is a diagram illustrating an example of interleaving.

Also, one picture may be defined as an I picture, and the other pictures may be defined as a P picture or a B picture at each frame clock time as illustrated in FIG. 12. In other words, the pictures may be split into groups of pictures (GOP) for each frame clock time. With such a structure, it is possible to start the decoding at an arbitrary clock time. In other words, it is possible to improve a random access property.

2. First Embodiment

<Coding device>

Figure 13:
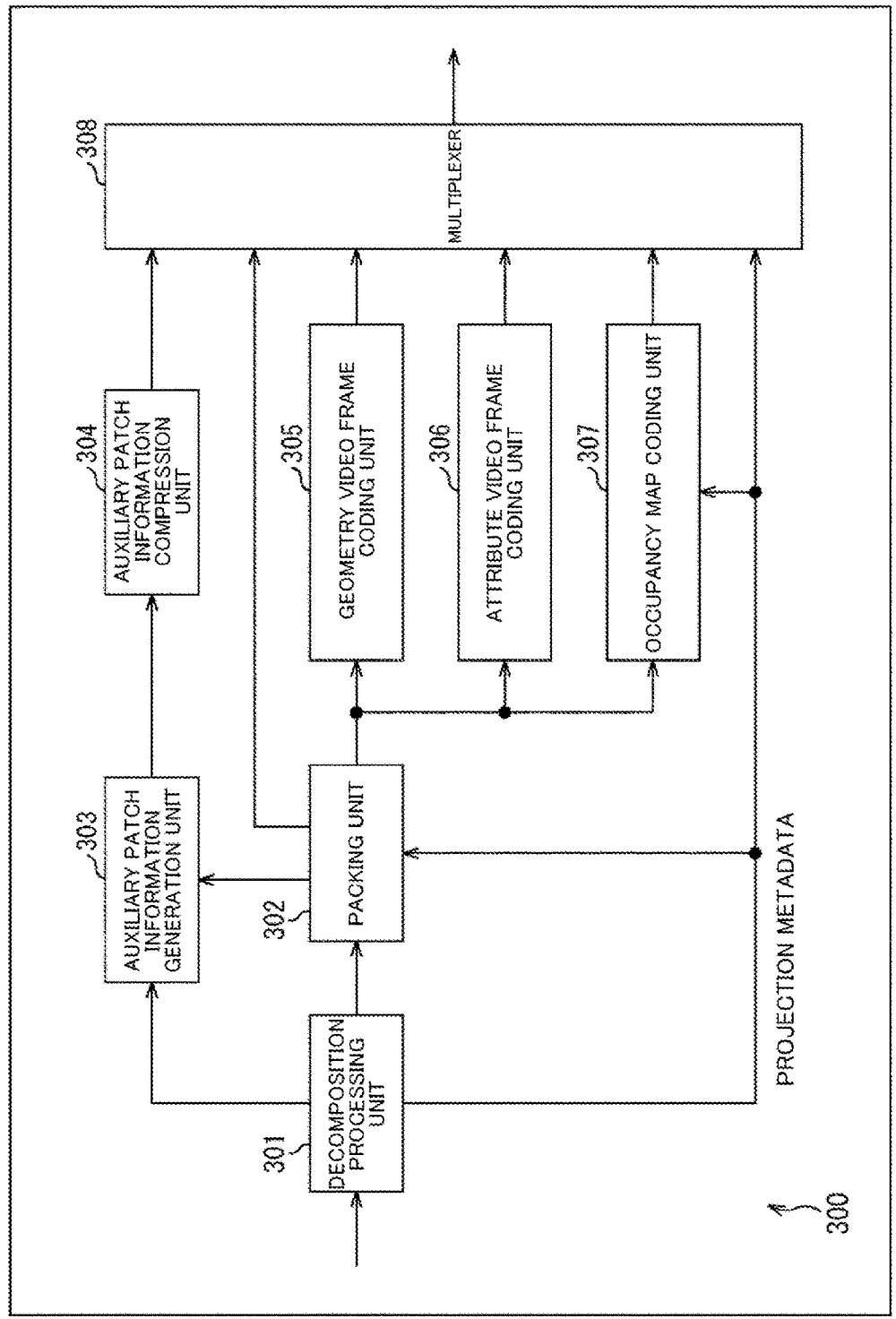
FIG. 13 is a block diagram illustrating an example of major components of a coding device.

FIG. 13 is a block diagram illustrating an example of a configuration of a coding device according to an embodiment of an image processing device to which the present technology is applied. A coding device 300 illustrated in FIG. 13 is a device that performs coding by a coding method for a two-dimensional image by applying a video-based approach and using point cloud data as a video frame. Also, the coding device 300 can associate a plurality of attributes with one geometry like multiple attributes.

FIG. 13 shows principal components such as processing units and data flows, and FIG. 13 does not show all components. In other words, processing units that are not illustrated in FIG. 13 as blocks and processing and data flows that are not illustrated in FIG. 13 as arrows and the like may be present in the coding device 300.

As illustrated in FIG. 13, the coding device 300 includes a decomposition processing unit 301, a packing unit 302, an auxiliary patch information generation unit 303, an auxiliary patch information compression unit 304, a geometry video frame coding unit 305, an attribute video frame coding unit 306, an occupancy map coding unit 307, and a multiplexer 308.

The decomposition processing unit 301 performs processing regarding decomposition of geometry data. For example, the decomposition processing unit 301 acquires a point cloud input to the coding device 300. Also, the decomposition processing unit 301 decomposes the acquired point cloud into patches and generates a geometry patch and an attribute patch. Then, the decomposition processing unit 301 supplies the patches to the packing unit 302.

Also, the decomposition processing unit 301 supplies information regarding the generated patches (for example, patch IDs, position information, and the like) to the auxiliary patch information generation unit 303. Furthermore, the decomposition processing unit 301 generates projection metadata which is information regarding points of view as needed and supplies the projection metadata to the packing unit 302, the occupancy map coding unit 307, and the multiplexer 308.

In a case where attributes to be coded are selected as described in <Example 1 in which number of attributes is variable> and <Example 3 in which number of attributes is variable>, for example, the decomposition processing unit 301 performs the selection. Then, the decomposition processing unit 301 generates patches (attribute patches) for only the selected attributes.

The packing unit 302 performs processing regarding packing. For example, the packing unit 302 acquires geometry and attribute patches supplied from the decomposition processing unit 301. Then, the packing unit 302 packs the acquired geometry patch in a video frame and generates a geometry video frame. The packing unit 302 supplies the generated geometry video frame to the geometry video frame coding unit 305.

Also, the packing unit 302 packs the acquired attribute patches in a video frame of each attribute and generates an attribute video frame. At that time, the packing unit 302 generates the attribute video frame as described above in <1. Adaptive multiple attribute>. For example, the packing unit 302 generates an attribute video frame that is a video frame in which a patch obtained by projecting each of a plurality of attributes to a two-dimensional plane for each partial region is arranged for each of the plurality of attributes corresponding to a single geometry of a point cloud that expresses an object with a three-dimensional shape as a group of points.

At that time, the packing unit 302 may generate the attribute video frame for each point cloud frame which is a frame of a point cloud. Also, the packing unit 302 may generate attribute video frames of the attributes that are present in the point cloud frame and may omit generation of attribute video frames of the attributes that are not present in the point cloud frame, from among the plurality of attributes.

In other words, the packing unit 302 may pack only patches of the attributes selected by the decomposition processing unit 301.

The packing unit 302 supplies the generated attribute video frames to the attribute video frame coding unit 306.

Moreover, the packing unit 302 generates an occupancy map on the basis of the generated geometry video frame. The packing unit 302 regards the generated occupancy map as a video frame and supplies the occupancy map to the occupancy map coding unit 307.

Also, the packing unit 302 supplies information regarding packing to the auxiliary patch information generation unit 303. For example, the packing unit 302 supplies the patch positions (u0, v0) and the like of the patches in the two-dimensional plane as the information regarding packing to the auxiliary patch information generation unit 303. Also, the packing unit 302 generates attribute information as described above in <1. Adaptive multiple attributes> and supplies the attribute information to the auxiliary patch information generation unit 303. In other words, the packing unit 302 generates attribute information which is information indicating the generated attribute video frames corresponding to mutually the same timing.

The auxiliary patch information generation unit 303 performs processing regarding generation of auxiliary patch information. For example, the auxiliary patch information generation unit 303 acquires various kinds of information supplied from the decomposition processing unit 301 and the packing unit 302. Then, the auxiliary patch information generation unit 303 generates auxiliary patch information including such information. In other words, the auxiliary patch information generation unit 303 generates patch information including the attribute information. The auxiliary patch information generation unit 303 supplies the generated auxiliary patch information to the auxiliary patch information compression unit 304.

The auxiliary patch information compression unit 304 performs processing regarding compression of the auxiliary patch information. For example, the auxiliary patch information compression unit 304 acquires the auxiliary patch information supplied from the auxiliary patch information generation unit 303. The auxiliary patch information compression unit 304 codes (compresses) the acquired auxiliary patch information. As described above, the auxiliary patch information includes the attribute information. In other words, the auxiliary patch information compression unit 304 codes (compresses) the attribute information. An arbitrary method is used as the coding method. For example, a coding scheme for a two-dimensional image may be applied, or a run-length coding or the like may be applied. The auxiliary patch information compression unit 304 supplies the obtained coded data of the auxiliary patch information to the multiplexer 308.

The geometry video frame coding unit 305 performs processing regarding coding of the geometry video frame. For example, the geometry video frame coding unit 305 acquires the geometry video frame supplied from the packing unit 302. Also, the geometry video frame coding unit 305 codes the acquired geometry video frame by an arbitrary coding method for a two-dimensional image such as advanced video coding (AVC) or high efficiency video coding (HEVC), for example, and generates coded data of the geometry video frame. The geometry video frame coding unit 305 supplies the coded data of the geometry video frame to the multiplexer 308.

The attribute video frame coding unit 306 performs processing regarding coding of the attribute video frames.

For example, the attribute video frame coding unit 306 acquires the attribute video frames supplied from the packing unit 302. Also, the attribute video frame coding unit 306 codes the acquired attribute video frames by an arbitrary coding method for a two-dimensional image such as AVC or HEVC, for example.

The attribute video frames has features as described above in <1. Adaptive multiple attributes>. In other words, a plurality of attribute video frames may be present at the same clock time. Also, the number of attribute video frames at each clock time is variable in the time direction. The attribute video frame coding unit 306 codes such attribute video frames as described above in <1. Adaptive multiple attributes>. For example, the attribute video frame coding unit 306 may perform coding by splitting a sequence for each attribute and generate coded data for each attribute. Also, the attribute video frame coding unit 306 may interleave all the attributes at a predetermined interval, codes the attributes as one sequence, and generate coded data including all the attributes.

The attribute video frame coding unit 306 supplies the coded data of the attribute video frames obtained through the coding to the multiplexer 308.

The occupancy map coding unit 307 performs processing regarding coding of the video frames of the occupancy map. For example, the occupancy map coding unit 307 acquires the occupancy map supplied from the packing unit 302. Also, the occupancy map coding unit 307 codes the acquired occupancy map by an arbitrary coding method for a two-dimensional image, for example. The occupancy map coding unit 307 supplies the coded data of the occupancy map obtained through the coding to the multiplexer 308.

The multiplexer 308 performs processing regarding multiplexing. For example, the multiplexer 308 acquires coded data (including attribute information) of the auxiliary patch information supplied from the auxiliary patch information compression unit 304. Also, the multiplexer 308 acquires the coded data of the geometry supplied from the geometry video frame coding unit 305. Moreover, the multiplexer 308 acquires the coded data of the attributes supplied from the attribute video frame coding unit 306. Additionally, the multiplexer 308 acquires the coded data of the occupancy map supplied from the occupancy map coding unit 307.

The multiplexer 308 multiplexes such acquired information and generates a bit stream. The multiplexer 308 outputs the generated bit stream to the outside of the coding device 300.

With such a configuration, the coding device 300 can suppress an increase in amount of coding as described above in <1. Adaptive multiple attributes>. In this manner, the coding device 300 can suppress an increase in load of the coding processing. Also, the coding device 300 can suppress an increase in load of the decoding processing. Furthermore, the coding device 300 can suppress an increase in load (a load of a transmission medium, a storage medium, and the like) when coded data is transmitted and stored. Additionally, the coding device 300 can suppress an increase in cost of the device and the system related to the video-based approach, such as the coding device 300 itself and a decoding device 400, which will be described later, for example.

Note that these processing units (the decomposition processing unit 301 to the multiplexer 308) have arbitrary configurations. For example, each processing unit may be configured by a logical circuit that realizes the aforementioned processing. Also, each processing unit may have, for example, a central processing unit (CPU), a read only memory (ROM), a random access memory (RAM), and the like and realize the aforementioned processing by executing a program using them. It goes without saying that each processing unit may have both the aforementioned configurations, realize parts of the aforementioned processing according to a logic circuit, and realize the other part of the processing by executing a program. The processing units may have independent configurations, for example, some processing units may realize parts of the aforementioned processing according to a logic circuit, some other processing units may realize the aforementioned processing by executing a program, and some other processing units may realize the aforementioned processing according to both a logic circuit and execution of a program.

<Flow of Coding Processing>

Figure 14:
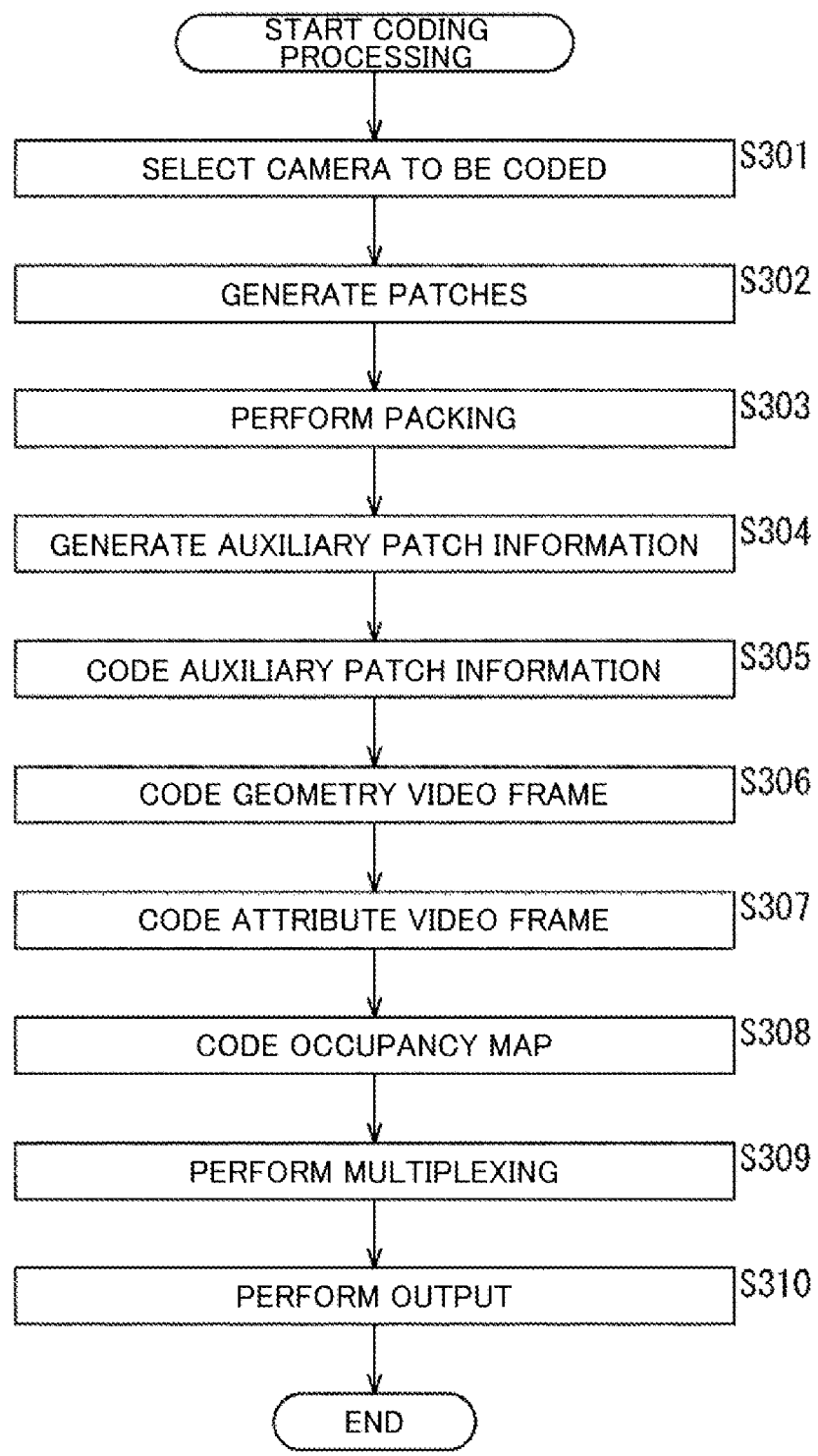
FIG. 14 is a flowchart for explaining an example of a flow of coding processing.

An example of a flow of coding processing executed by the coding device 300 will be described with reference to the flowchart in FIG. 14.

If the coding processing is started, then the decomposition processing unit 301 of the coding device 300 selects attributes (cameras) to be coded as described above in <1. Adaptive multiple attributes> in Step S301.

In Step S302, the decomposition processing unit 301 decomposes a point cloud into patches and generates geometry and attribute patches. At that time, the decomposition processing unit 301 generates patches for only the attributes selected in Step S301 among the attributes.

In Step S303, the packing unit 302 packs the patches generated in Step S302 into a video frame. For example, the packing unit 302 packs the geometry patch and generates a geometry video frame. Also, the packing unit 302 packs a patch of each attribute and generates an attribute video frame for each attribute. Moreover, the packing unit 302 generates an occupancy map on the basis of the generated geometry video frame.

Also, the packing unit 302 generates information regarding packing and attribute information as described above in <1. Adaptive multiple attributes>.

In Step S304, the auxiliary patch information generation unit 303 generates the information regarding the patches generated in Step S302 and the auxiliary information including the information regarding packing generated in Step S303 and the attribute information.

In Step S305, the auxiliary patch information compression unit 304 codes the auxiliary patch information generated in Step S305 by a predetermined coding method. Note that the auxiliary patch information includes the attribute information. In other words, the auxiliary patch information compression unit 304 codes (compresses) the attribute information.

In Step S306, the geometry video frame coding unit 305 codes the geometry video frame obtained through the processing in Step S303 by a coding method for a two-dimensional image.

In Step S307, the attribute video frame coding unit 306 codes the attribute video frames obtained in the processing in Step S303 by a coding method for a two-dimensional image. As described above in <1. Adaptive multiple attributes>, a plurality of attribute video frames may be present at the same clock time. Also, the number of attribute video frames at each clock time is variable. The attribute video frame coding unit 306 codes such attribute video frames as described above in <1. Adaptive multiple attributes>. For example, the attribute video frame coding unit 306 can code the attribute video frames in a split manner for each attribute or may interleave all the attributes, integrate all the attributes as one sequence, and code the sequence.

In Step S308, the occupancy map coding unit 307 codes the occupancy map obtained through processing in Step S303 by a coding method for a two-dimensional image.

In Step S309, the multiplexer 308 multiplexes various kinds of information generated as described above and generates a bit stream including such information. In Step S310, the multiplexer 308 outputs the bit stream generated through the processing in Step S309 to the outside of the coding device 300. When the processing in Step S310 ends, the coding processing ends.

The coding device 300 can suppress an increase in amount of coding as described above in <1. Adaptive multiple attributes> by executing the coding processing as described above. In this manner, the coding device 300 can suppress an increase in load of the coding processing. Also, the coding device 300 can suppress an increase in load of the decoding processing. Furthermore, the coding device 300 can suppress an increase in load (a load of the transmission medium, the storage medium, and the like) when the coded data is transmitted and stored.

Additionally, the coding device 300 can suppress an increase in cost of the device and the system related to the video-based approach, such as the coding device 300 itself and a decoding device 400, which will be described later, for example.

3. Second Embodiment

<Decoding Device>

Figure 15:
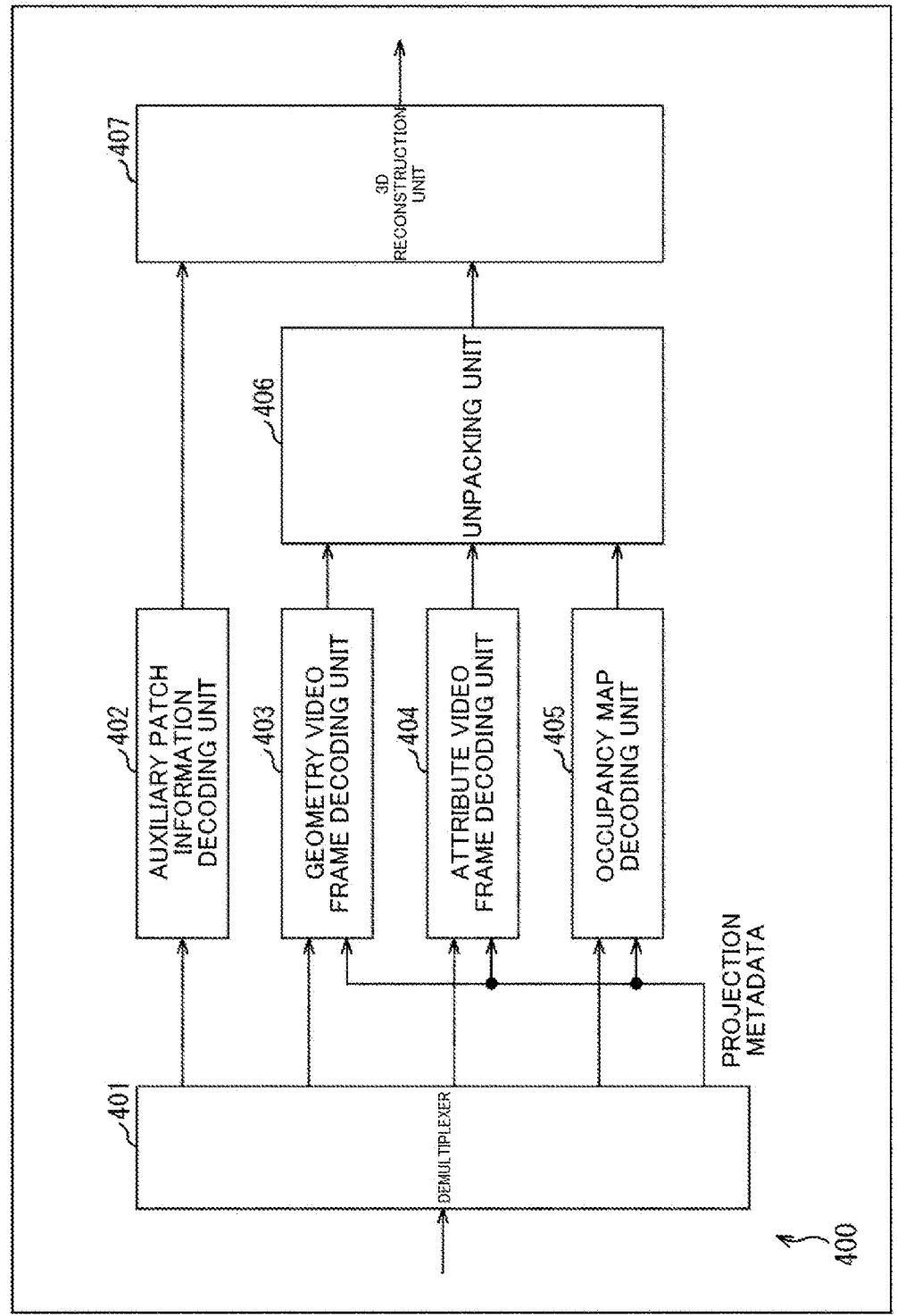
FIG. 15 is a block diagram illustrating an example of major components of a decoding device.

FIG. 15 is a block diagram illustrating an example of a configuration of a decoding device according to an aspect of an image processing device to which the present technology is applied. A decoding device 400 illustrated in FIG. 15 is a device that applies a video-based approach, decodes coded data obtained by coding a point cloud data as a video frame by a coding method for a two-dimensional image by a decoding method for a two-dimensional image, and generates (reconstructs) the point cloud.

FIG. 15 shows principal components such as processing units and data flows, and FIG. 15 does not show all components. That is, processing units that are not illustrated in FIG. 15 as blocks and processing and data flows that are not illustrated in FIG. 15 as arrows and the like may be present in the decoding device 400.

The decoding device 400 includes a demultiplexer 401, an auxiliary patch information decoding unit 402, a geometry video frame decoding unit 403, an attribute video frame decoding unit 404, an occupancy map decoding unit 405, an unpacking unit 406, and a 3D reconstruction unit 407 as illustrated in FIG. 15.

The demultiplexer 401 performs processing regarding demultiplexing of data. For example, the demultiplexer 401 acquires a bit stream to be input to the decoding device 400. The bit stream is generated by the coding device 300 coding point cloud data, for example.

Also, the demultiplexer 401 demultiplexes the bit stream. For example, the demultiplexer 401 extracts coded data of the auxiliary patch information from the bit stream through the demultiplexing. Then, the demultiplexer 401 supplies the extracted coded data of the auxiliary patch information to the auxiliary patch information decoding unit 402.

Also, the demultiplexer 401 extracts coded data of the geometry video frame from the bit stream through the demultiplexing. Then, the demultiplexer 401 supplies the extracted coded data of the geometry video frame to the geometry video frame decoding unit 403.

Furthermore, the demultiplexer 401 extracts coded data of the attribute video frames from the bit stream through the demultiplexing. Then, the demultiplexer 401 supplies the extracted coded data of the attribute video frames to the attribute video frame decoding unit 404.

Also, the demultiplexer 401 extracts coded data of the occupancy map from the bit stream data through the demultiplexing. Then, the demultiplexer 401 supplies the extracted coded data of the occupancy map to the occupancy map decoding unit 405.

Furthermore, the demultiplexer 401 may supply the projection metadata signaled on the coding side to the geometry video frame decoding unit 403, the attribute video frame decoding unit 404, and the occupancy map decoding unit 405.

The auxiliary patch information decoding unit 402 performs processing regarding decoding of the coded data of the auxiliary patch information. For example, the auxiliary patch information decoding unit 402 acquires coded data of the auxiliary patch information supplied from the demultiplexer 401. Also, the auxiliary patch information decoding unit 402 decodes the coded data and generates auxiliary patch information. The auxiliary patch information includes attribute information. In other words, the auxiliary patch information decoding unit 402 decodes the coded data and generates attribute information. Note that the decoding method is an arbitrary method as long as the method (a decoding method which is not for a two-dimensional image) corresponds to the decoding method applied at the time of coding (the coding method that the auxiliary patch information compression unit 304 has applied, for example) Furthermore, the auxiliary patch information decoding unit 402 supplies the auxiliary patch information to the 3D reconstruction unit 407.

The geometry video frame decoding unit 403 performs processing regarding decoding of the coded data of the geometry video frame. For example, the geometry video frame decoding unit 403 acquires the coded data of the geometry video frame supplied from the demultiplexer 401. Also, the geometry video frame decoding unit 403 decodes the coded data and generates the geometry video frame. Furthermore, the geometry video frame decoding unit 403 can supply the geometry video frame to the unpacking unit 406.

The attribute video frame decoding unit 404 performs processing regarding decoding of the coded data of the attribute video frames. For example, the attribute video frame decoding unit 404 acquires coded data of the attribute video frames supplied from the demultiplexer 401. Also, the attribute video frame decoding unit 404 decodes the coded data and generates attribute video frames.

The attribute video frames have features as described above in <1. Adaptive multiple attributes>. In other words, a plurality of attribute video frames may be present at the same clock time. Also, the number of attribute video frames at each clock time is variable. The attribute video frame decoding unit 404 decodes such coded data of the attribute video frames as described above in <1. Adaptive multiple attributes>. For example, the attribute video frame decoding unit 404 may generate the attribute video frame of each attribute by decoding the coded data for each attribute. Also, the attribute video frame decoding unit 404 may generate the attribute video frame of each attribute by decoding the coded data including all the attributes interleaved and integrated as one sequence.

Also, the attribute video frame decoding unit 404 may decode the coded data at each frame clock time of the video and generate the attribute video frame. Also, the attribute video frame decoding unit 404 may decode the coded data of only the attributes that are present at each frame clock time and generate attribute video frames.

The attribute video frame decoding unit 404 supplies the attribute video frames to the unpacking unit 406.

The occupancy map decoding unit 405 performs processing regarding decoding of the coded data of the occupancy map. For example, the occupancy map decoding unit 405 acquires the coded data of the occupancy map supplied from the demultiplexer 401. Also, the occupancy map decoding unit 405 decodes the coded data and generates the occupancy map. Furthermore, the occupancy map decoding unit 415 supplies the occupancy map to the unpacking unit 406.

The unpacking unit 406 performs processing regarding unpacking. For example, the unpacking unit 406 acquires the geometry video frame supplied from the geometry video frame decoding unit 403. Also, the unpacking unit 406 acquires the attribute video frames supplied form the attribute video frame decoding unit 404. Additionally, the unpacking unit 406 acquires the occupancy map supplied from the occupancy map decoding unit 405.

Furthermore, the unpacking unit 406 unpacks the geometry video frame and each attribute video frame and generates patches on the basis of the occupancy map. Also, the unpacking unit 406 supplies the generated geometry and attribute patches and the like to the 3D reconstruction unit 407.

The 3D reconstruction unit 407 performs processing regarding generation (reconstruction) of a point cloud (3D data). For example, the 3D reconstruction unit 407 acquires the auxiliary patch information supplied from the auxiliary patch information decoding unit 402. Also, the 3D reconstruction unit 407 acquires the geometry and attribute patches and the like supplied from the unpacking unit 406. The 3D reconstruction unit 407 generates (reconstructs) the point cloud using such information. At that time, the 3D reconstruction unit 407 performs as described above in <1. Adaptive multiple attributes>.

For example, the 3D reconstruction unit 407 refers to the attribute information included in the auxiliary patch information and recognizes which of the attributes the present patches correspond to. In this manner, the 3D reconstruction unit 407 can accurately generate (reconstruct) the point cloud using the auxiliary patch information, the geometry and attribute patches, and the like.

Also, the 3D reconstruction unit 407 may generate the point cloud using the attributes in a state where all the attribute video frames have not been prepared. In other words, the 3D reconstruction unit 407 may generate the point cloud without interpolating the attribute video frames that are not present after decoding.

Also, the 3D reconstruction unit 407 may interpolate the attribute video frames that are not present after decoding using attribute video frames of other attributes. For example, the 3D reconstruction unit 407 may perform replacement with an average or a weighted average of all the attributes that are present after decoding at the same frame clock time as that of the attribute video frames that are not present after decoding. Also, the 3D reconstruction unit 407 may perform replacement with an attribute video frame of an attribute that has the closest camera position to those of the attribute video frames that are not present after decoding at the same frame clock time as that of the attribute video frames that are not present after decoding. Furthermore, the 3D reconstruction unit 407 may perform replacement with an average or a weighted average of a plurality of attributes that have sufficiently close camera positions to those of the attribute video frames that are not present after decoding at the same frame clock time as that of the attribute video frames that are not present after decoding. Also, the 3D reconstruction unit 407 may perform replacement with a base attribute at the same frame clock time as that of the attribute video frames that are not present after decoding.

The 3D reconstruction unit 407 outputs the point cloud data obtained through such processing to the outside of the decoding device 400. The point cloud data is rendered and is then displayed on the display unit, is recorded in a recording medium, or is supplied to another device through communication, for example.

With such a configuration, the decoding device 400 can suppress an increase in amount of coding as described above in <1. Adaptive multiple attributes>. In this manner, the decoding device 400 can suppress an increase in load of the decoding processing. Also, the decoding device 400 can suppress an increase in load (a load of the transmission medium, a recording medium, and the like) when the coded data is transmitted and stored. Also, the decoding device 400 can suppress an increase in cost of the device and the system regarding the video-based approach, such as the coding device 300 and the decoding device 400 themselves, for example.

Note that these processing units (the demultiplexer 401 to the 3D reconstruction unit 407) have arbitrary configurations. For example, each processing unit may be configured as a logic circuit for realizing the aforementioned processing. Furthermore, each processing unit may include, for example, a CPU, a ROM, a RAM, and the like and execute a program using these components to realize the aforementioned processing. It goes without saying that each processing unit may have both the aforementioned configurations, realize parts of the aforementioned processing according to a logic circuit, and realize the other part of the processing by executing a program. The processing units may have independent configurations, for example, some processing units may realize parts of the aforementioned processing according to a logic circuit, some other processing units may realize the aforementioned processing by executing a program, and some other processing units may realize the aforementioned processing according to both a logic circuit and execution of a program.

<Flow of Decoding Processing>

Figure 16:
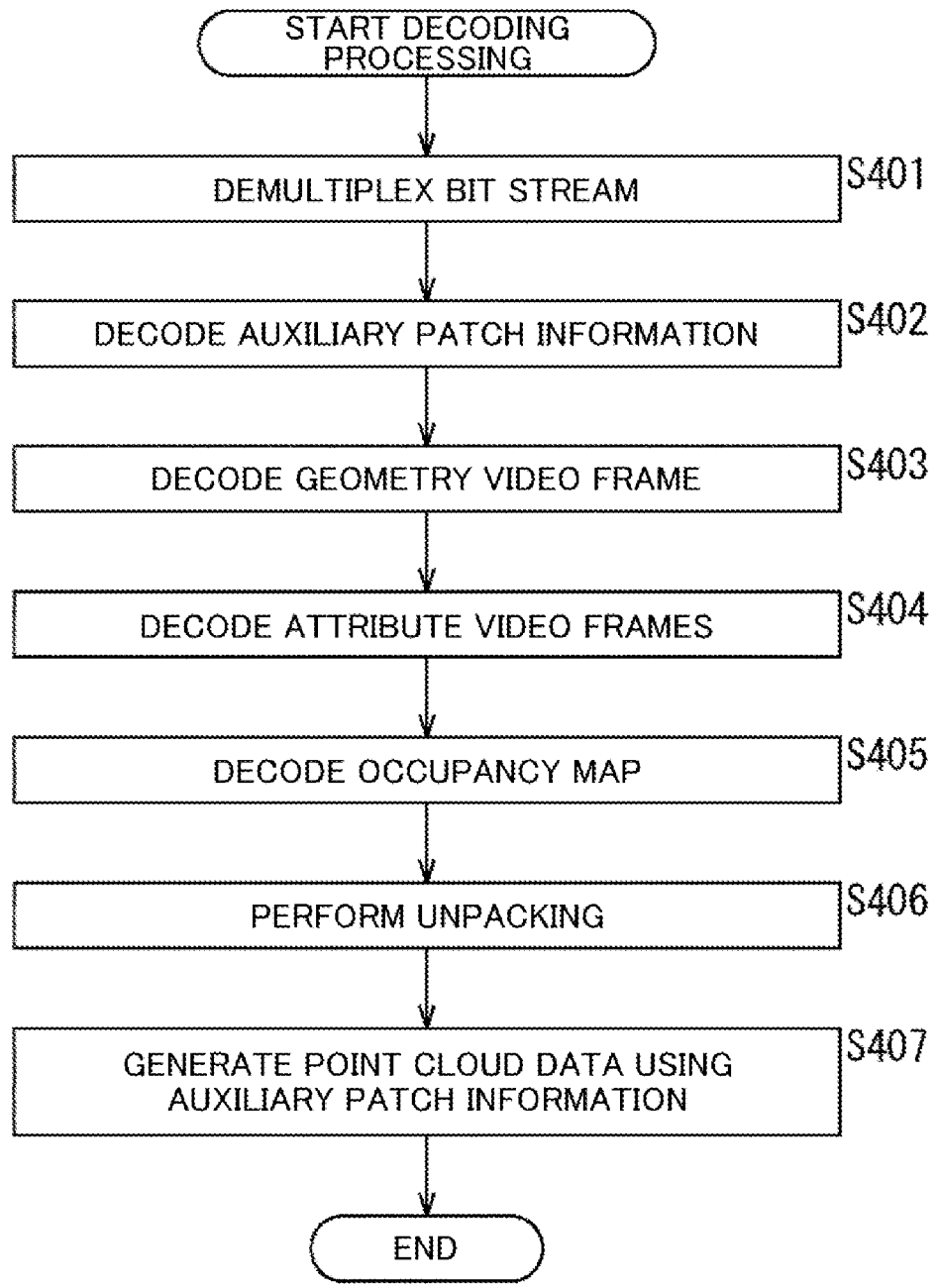
FIG. 16 is a flowchart for explaining an example of a flow of decoding processing.

An example of a flow of decoding processing executed by such a decoding device 400 will be described with reference to the flowchart in FIG. 16.

Once the decoding processing is started, then the demultiplexer 401 of the decoding device 400 demultiplexes the bit stream in Step S401.

In Step S402, the auxiliary patch information decoding unit 402 decodes the coded data of the auxiliary patch information extracted from the bit stream through the processing in Step S401. The auxiliary patch information includes attribute information. In other words, the auxiliary patch information decoding unit 402 decodes the coded data and generates the attribute information.

In Step S403, the geometry video frame decoding unit 403 decodes the coded data of the geometry video frame extracted from the bit stream through the processing in Step S401.

In Step S404, the attribute video frame decoding unit 404 decodes the coded data of the attribute video frames extracted from the bit stream through the processing in Step S401.

The attribute video frame has features as described above in <1. Adaptive multiple attributes>. In other words, a plurality of attribute video frames may be present at the same clock time. Also, the number of attribute video frames at each clock time is variable. The attribute video frame decoding unit 404 decodes such coded data of the attribute video frames as described above in <1. Adaptive multiple attributes>. For example, the attribute video frame decoding unit 404 may generate the attribute video frame of each attribute by decoding the coded data for each attribute. Also, the attribute video frame decoding unit 404 may generate the attribute video frame of each attribute by decoding the coded data including all the attributes interleaved and integrated as one sequence.

In Step S405, the occupancy map decoding unit 405 decodes the coded data of the occupancy map extracted from the bit stream through the processing in Step S401.

In Step S406, the unpacking unit 406 unpacks each of the geometry video frame and the attribute video frames on the basis of the occupancy map and the like and generates (restores) geometry and attribute patches.

In Step S407, the 3D reconstruction unit 407 generates (reconstructs) the point cloud on the basis of the auxiliary patch information generated in Step S402 and various kinds of information obtained in Step S406. At that time, the 3D reconstruction unit 407 performs processing as described above in <1. Adaptive multiple attributes>.

For example, the 3D reconstruction unit 407 refers to the attribute information included in the auxiliary patch information and recognizes which of the attributes the present patches correspond to. In this manner, the 3D reconstruction unit 407 can accurately generate (reconstruct) the point cloud using the auxiliary patch information, the geometry and attribute patches, and the like.

Also, the 3D reconstruction unit 407 may generate the point cloud using the attributes in a state where all the attribute video frames have not been prepared. In other words, the 3D reconstruction unit 407 may generate the point cloud without interpolating the attribute video frames that are not present after decoding.

Also, the 3D reconstruction unit 407 may interpolate the attribute video frames that are not present after decoding using attribute video frames of other attributes. For example, the 3D reconstruction unit 407 may perform replacement with an average or a weighted average of all the attributes that are present after decoding at the same frame clock time as that of the attribute video frames that are not present after decoding. Also, the 3D reconstruction unit 407 may perform replacement with an attribute video frame of an attribute that has the closest camera position to those of the attribute video frames that are not present after decoding at the same frame clock time as that of the attribute video frames that are not present after decoding. Furthermore, the 3D reconstruction unit 407 may perform replacement with an average or a weighted average of a plurality of attributes that have sufficiently close camera positions to those of the attribute video frames that are not present after decoding at the same frame clock time as that of the attribute video frames that are not present after decoding. Also, the 3D reconstruction unit 407 may perform replacement with a base attribute at the same frame clock time as that of the attribute video frames that are not present after decoding.

The 3D reconstruction unit 407 outputs the point cloud data obtained through such processing to the outside of the decoding device 400. When processing of step S407 ends, decoding processing ends.

The decoding device 400 can suppress an increase in amount of coding as described above in <1. Adaptive multiple attributes> by executing the decoding processing as described above. In this manner, the decoding device 400 can suppress an increase in load of the decoding processing. Also, the decoding device 400 can suppress an increase in load (a load of the transmission medium, the storage medium, and the like) when the coded data is transmitted and stored. Furthermore, the decoding device 400 can suppress an increase in cost of the device and the system regarding the video-based approach, such as the coding device 300 and the decoding device 400 themselves, for example.

<4. Supplement>
<Computer>

The above-described series of processing can be executed by hardware or software. In the case where the series of processes are executed by software, a program that configures the software is installed on a computer. Here, the computer includes, for example, a computer built in dedicated hardware and a general-purpose personal computer on which various programs are installed to be able to execute various functions.

Figure 17:
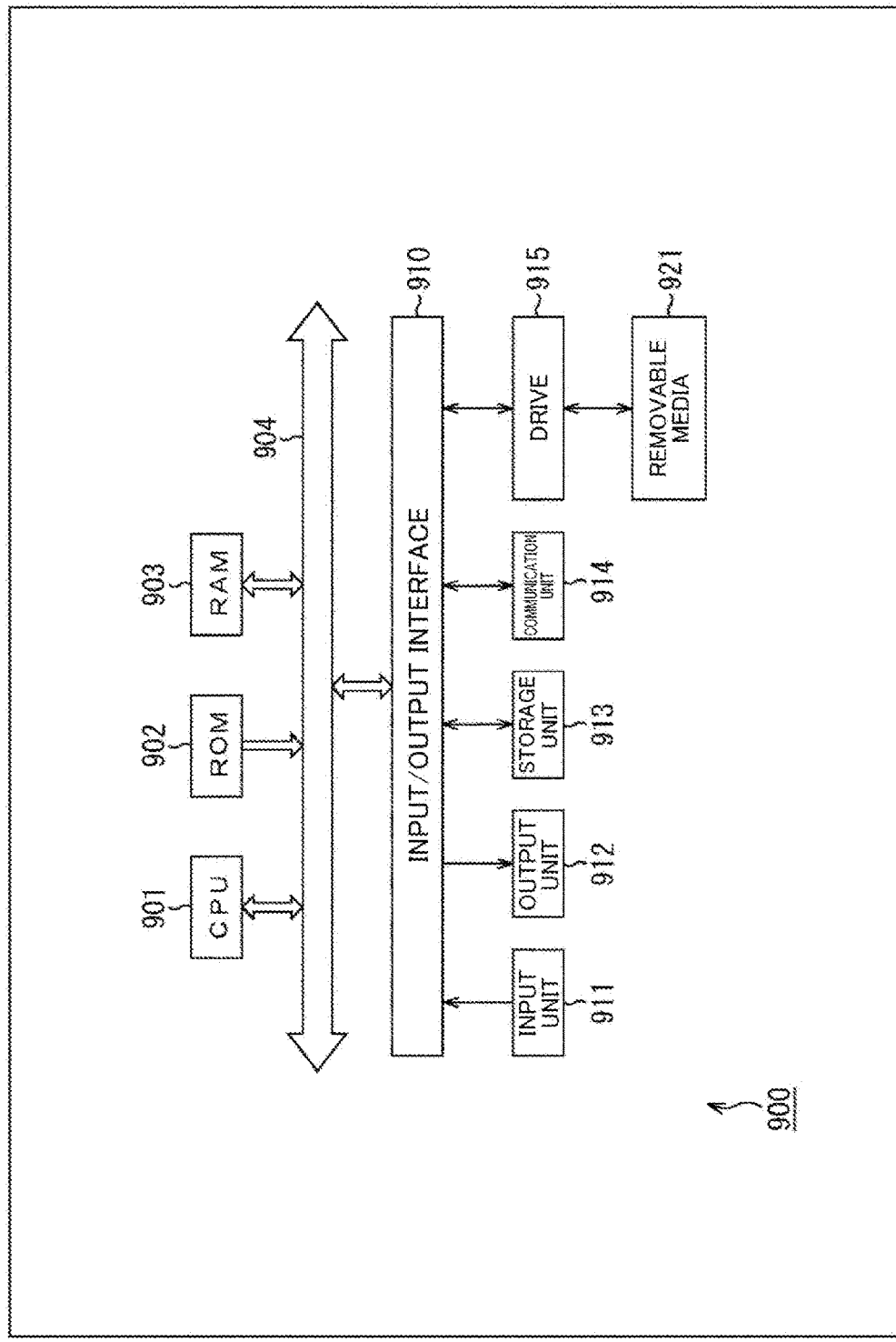
FIG. 17 is a block diagram illustrating an example of major components of a computer.

FIG. 17 is a block diagram illustrating a configuration example of hardware of a computer that executes the aforementioned series of processes on the basis of a program.

In a computer 900 illustrated in FIG. 17, a central processing unit (CPU) 901, a read only memory (ROM) 902, and a random access memory (RAM) 903 are connected to each other via a bus 904.

An input/output interface 910 is also connected to the bus 904. An input unit 911, an output unit 912, a storage unit 913, a communication unit 914, and a drive 915 are connected to the input/output interface 910.

The input unit 911 is, for example, a keyboard, a mouse, a microphone, a touch panel, or an input terminal. The output unit 912 is, for example, a display, a speaker, or an output terminal. The storage unit 913 includes, for example, a hard disk, a RAM disk, or a non-volatile memory. The communication unit 914 includes, for example, a network interface. The drive 915 drives a removable medium 921 such as a magnetic disk, an optical disc, a magneto-optical disk, or a semiconductor memory.

In the computer having the above configuration, the CPU 901 performs the aforementioned series of processes by loading a program stored in the storage unit 913 to the RAM 903 via the input/output interface 910 and the bus 904 and executing the program, for example. The RAM 903 also appropriately stores data and the like necessary for the CPU 901 to execute various kinds of processing.

The program executed by the computer can be recorded in, for example, the removable medium 921 as a package medium or the like and applied in such a form. In such a case, the program can be installed in the storage unit 913 via the input/output interface 910 by inserting the removable medium 921 into the drive 915.

This program can also be provided via wired or wireless transfer medium such as a local area network, the Internet, and digital satellite broadcasting. In such a case, the program can be received by the communication unit 914 and installed in the storage unit 913.

In addition, this program may be installed in advance in the ROM 902 or the storage unit 913.

<Application Target of Present Technology>

Although cases in which the present technology is applied to coding/decoding of point cloud data have been described above, the present technology is not limited to such examples and can be applied to coding/decoding of 3D data in any standard. That is, various types of processing such as coding/decoding methods, and specifications of various types of data such as 3D data and metadata may be arbitrary as long as they do not contradict the above-described present technology. In addition, the above-described some processing and specifications may be omitted as long as it does not contradict the present technology.

Moreover, although the coding device 300, the decoding device 400, and the like have been described above as examples to which the present technology is applied, the present technology can be applied to any configuration.

For example, the present technology can be applied to various electronic devices such as a transmitter or a receiver (for example, a television receiver or a mobile phone) in satellite broadcasting, wired broadcasting of a cable TV or the like, distribution on the Internet, or distribution to a terminal through cellular communication, or a device (for example, a hard disk recorder or a camera) recording an image on a medium such as an optical disc, a magnetic disk, and a flash memory or reproducing an image from the storage medium.

For example, the present technology can be implemented as a configuration of a part of a device such as a processor (for example, a video processor) of a system large scale integration (LSI), a module (for example, a video module) using a plurality of processors or the like, a unit (for example, a video unit) using a plurality of modules or the like, or a set (for example, a video set) with other functions added to the unit.

Also, the present technology can also be applied to a network system configured of a plurality of devices, for example. The present technology may be performed by cloud computing in which it is assigned to and processed together by a plurality of devices via a network, for example. For example, the present technology may be performed in a cloud service that provides services regarding images (moving images) to arbitrary terminals such as a computer, an audio visual (AV) device, a mobile information processing terminal, an Internet-of-Things (IoT) device, and the like.

In the present specification, a system means a set of a plurality of constituent elements (devices, modules (parts), or the like) and all the constituent elements may not be in the same casing. Accordingly, a plurality of devices accommodated in separate casings and connected via a network and a single device accommodating a plurality of modules in a single casing are all a system.

<Fields and Applications to which Present Technology is Applicable>

A system, device, a processing unit, and the like to which the present technology is applied can be used in any field such as traffic, medical treatment, security, agriculture, livestock industries, a mining industry, beauty, factories, home appliance, weather, and natural surveillance, for example. Any purpose can be set.

<Others>

Note that the "flag" in the present specification is information for identifying a plurality of states and includes not only information used to identify two states, namely true (1) or false (0), but also information with which three or more states can be identified. Therefore, values that the "flag" can take may be, for example, two values of 1 and 0 or three or more values. In other words, the number of bits constituting the "flag" may be an arbitrary number and may be 1 bit or a plurality of bits. Also, since not only the form in which the identification information is included in a bit stream but also the form in which difference information of identification information with respect to certain reference information is included in a bit stream can be assumed as the identification information (including the flag), the "flag" and the "identification information" in the present specification include not only the information itself but also the difference information with respect to the reference information.

Also, various kinds of information (such as metadata) related to coded data (bit stream) may be transmitted or recorded in any form as long as it is associated with the coded data. Here, the term "associated" means that when one data is processed, the other may be used (may be linked), for example. In other words, mutually associated items of data may be integrated as one item of data or may be individual items of data. For example, information associated with coded data (image) may be transmitted through a transmission path that is different from that for the coded data (image). Also, the information associated with the coded data (image) may be recorded in a recording medium that is different from that for the coded data (image) (or a different recording area in the same recording medium), for example. Meanwhile, this "association" may be for part of data, not the entire data. For example, an image and information corresponding to the image may be associated with a plurality of frames, one frame, or any unit such as a part in the frame.

Meanwhile, in the present specification, terms such as "synthesize", "multiplex", "add", "integrate", "include", "store", "put in", "enclose", and "insert" may mean, for example, combining a plurality of objects into one, such as combining coded data and metadata into one piece of data, and means one method of "associating" described above.

Embodiments of the present technology are not limited to the above-described embodiments and can be changed variously within the scope of the present technology without departing from the gist of the present technology.

For example, a configuration described as one device (or processing unit) may be split into and configured as a plurality of devices (or processing units). Conversely, configurations described above as a plurality of devices (or processing units) may be integrated and configured as one device (or processing unit). Also, it is a matter of course that configurations other than the aforementioned configurations may be added to the configuration of each device (or each processing unit). Moreover, some of configurations of a certain device (or processing unit) may be included in a configuration of another device (or another processing unit) as long as configurations and operations of the entire system are substantially the same.

Also, the aforementioned program may be executed by an arbitrary device, for example. In that case, it is only necessary for the device to have necessary functions (such as functional blocks) such that the device can obtain necessary information.

Further, for example, each step of one flowchart may be executed by one device, or may be shared and executed by a plurality of devices. Further, when a plurality of processing are included in one step, one device may execute the plurality of processing, or the plurality of devices may share and execute the plurality of processing. In other words, it is also possible to execute the plurality of processing included in one step as processing of a plurality of steps. On the other hand, it is also possible to execute processing described as a plurality of steps collectively as one step.

Further, for example, in a program that is executed by a computer, processing of steps describing the program may be executed in time series in an order described in the present specification, or may be executed in parallel or individually at a required timing such as when call is made. That is, the processing of the respective steps may be executed in an order different from the above-described order as long as there is no contradiction. Further, the processing of the steps describing this program may be executed in parallel with processing of another program, or may be executed in combination with the processing of the other program.

Further, for example, a plurality of technologies regarding the present technology can be independently implemented as a single body as long as there is no contradiction. Of course, it is also possible to perform any plurality of the present technologies in combination. For example, it is also possible to implement some or all of the present technologies described in any of the embodiments in combination with some or all of the present technologies described in other embodiments. Further, it is also possible to implement some or all of any of the aforementioned present technologies in combination with other technologies not described above.

The present technology can also be configured as follows.

(1) An image processing device including: an attribute video frame generation unit that generates an attribute video frame that is a video frame in which a patch obtained by projecting each of a plurality of attributes to a two-dimensional plane for each partial region is arranged for each of the plurality of attributes corresponding to a single geometry of a point cloud that expresses an object with a three-dimensional shape as a group of points; an attribute video frame coding unit that codes the attribute video frame of each attribute that has been generated by the attribute video frame generation unit; and an attribute information generation unit that generates attribute information that is information indicating the attribute video frames which have been generated by the attribute video frame generation unit and correspond to mutually the same timing.

(2) The image processing device according to (1), in which the attribute video frame generation unit generates the attribute video frame for each point cloud frame which is a frame of the point cloud.

(3) The image processing device according to (2), in which the attribute video frame generation unit generates the attribute video frames of attributes that are present in the point cloud frames from among the plurality of attributes and omits generation of the attribute video frames of the attributes that are not present in the point cloud frames.

(4) The image processing device according to (3), in which the attribute information includes a list of the attributes that are present in the point cloud frames.

(5) The image processing device according to (3), in which the attribute information includes a list of the attributes that are not present in the point cloud frames.

(6) The image processing device according to any one of (3) to (5), in which the attribute information generation unit generates the attribute information for each of the point cloud frames.

(7) The image processing device according to any one of (3) to (5), in which the attribute information generation unit generates the attribute information in a case where the attributes that are present have changed in comparison with the previous point cloud frame, and omits generation of the attribute information in a case where the attributes that are present have not changed.

(8) The image processing device according to (7), in which the attribute information includes information regarding a difference of the attributes from those in the previous point cloud frame.

(9) The image processing device according to any one of (1) to (8), in which the attribute video frame coding unit codes the attribute video frame of each attribute as a video sequence for the attribute and generates coded data for the attribute.

(10) The image processing device according to any one of (1) to (8), in which the attribute video frame coding unit codes the attribute video frames of all the attributes as one video sequence and generates coded data including all the attributes.

(11) The image processing device according to (10), in which the attribute video frame coding unit interleaves the attribute video frame of each attribute at a predetermined interval and codes the attribute video frame.

(12) The image processing device according to (11), in which the attribute information includes a parameter indicating the interval.

(13) The image processing device according to any one of (1) to (12), in which each of the plurality of attributes includes a texture of the object obtained at mutually different points of view.

(14) An image processing method including: generating an attribute video frame that is a video frame in which a patch obtained by projecting each of a plurality of attributes to a two-dimensional plane for each partial region is arranged for each the plurality of attributes corresponding to a single geometry of a point cloud that expresses an object with a three-dimensional shape as a group of points; coding the generated attribute video frame of each attribute; and generating attribute information that is information indicating the generated attribute video frames corresponding to mutually the same timing.

(15) An image processing device including: an attribute video frame decoding unit that decodes coded data and generates an attribute video frame that is a video frame in which a patch obtained by projecting each of a plurality of attributes to a two-dimensional plane for each partial region is arranged, the attribute video frame corresponding to each of the plurality of attributes corresponding to a single geometry of a point cloud that expresses an object with a three-dimensional shape as a group of points; an attribute information decoding unit that decodes the coded data and generates attribute information that is information indicating attribute video frames mutually corresponding to the same timing; and a point cloud generation unit that generates the point cloud on the basis of the attributes included in the attribute video frames generated by the attribute video frame decoding unit and the attribute information generated by the attribute information decoding unit.

(16) The image processing device according to (15), in which the attribute video frame decoding unit decodes the coded data obtained by coding the attribute video frame of each point cloud frame that is a frame of the point cloud and generates the attribute video frame.

(17) The image processing device according to (16), in which the attribute video frame decoding unit decodes the coded data obtained by coding the attribute video frames generated for the attributes that are present in the point cloud frames from among the plurality of attributes and omitting generation thereof for the attributes that are not present, and generates the attribute video frames of the attributes that are present in the point cloud frames.

(18) The image processing device according to (17), in which the point cloud generation unit generates the attributes that are not present in the point cloud frames using other attributes.

(19) The image processing device according to (17), in which the point cloud generation unit generates the attributes that are not present in the point cloud frames using an average of other attributes.

(20) The image processing device according to (17), in which the point cloud generation unit generates the attributes that are not present in the point cloud frames using a weighted average of other attributes.

(21) The image processing device according to any one of (15) to (20, in which each of the plurality of attributes includes a texture of the object obtained at mutually different points of view.

(22) An image processing method including: decoding coded data and generating an attribute video frame that is a video frame in which a patch obtained by projecting each of a plurality of attributes to a two-dimensional frame for each partial region is arranged, the attribute video frame corresponding to each of the plurality of attributes corresponding to a single geometry of a point cloud that expresses an object with a three-dimensional shape as a group of points; decoding the coded data and generating attribute information that is information indicating the attribute video frames mutually corresponding to the same timing; and generating the point cloud on the basis of the attributes included in the generated attribute video frames and the generated attribute information.

REFERENCE SIGNS LIST

300 Coding device
301 Decomposition processing unit
302 Packing unit
303 Auxiliary patch information generation unit
304 Auxiliary patch information compression unit
305 Geometry video frame coding unit
306 Attribute video frame coding unit
307 Occupancy map coding unit
308 Multiplexer
400 Decoding device
401 Demultiplexer
402 Auxiliary path information decoding unit
403 Geometry video frame decoding unit
404 Attribute video frame decoding unit
405 Occupancy map decoding unit
406 Unpacking unit
407 3D reconstruction unit

The invention claimed is:

1. An image encoding device comprising:
   circuitry configured to
   acquire 3D data corresponding to a 3D object, wherein
      the 3D data is expressed with a plurality of attributes each corresponding to a single geometry of the 3D object,
      the attributes include a first attribute and a second attribute, and
      viewpoints include a first viewpoint at a first time and a second viewpoint at a second time,
   acquire instruction information indicating a rendering path from the first time to the second time,
   generate, based on the rendering path, partial attribute video frames including
      a first attribute video frame of the first time that includes the first attribute and the second attribute, and
      a second attribute video frame of the second time that includes the second attribute but excludes the first attribute,
   code the partial attribute video frames, and
   generate attribute information indicating
      whether each of the first attribute and the second attribute is included in the coded partial attribute video frames at the first time, and
      whether each of the first attribute and the second attribute is included in the coded partial attribute video frames at the second time.

2. The image encoding device according to claim 1, wherein the attribute information includes a list indicating at least one attribute of the plurality of attributes that is not present in the coded partial attribute video frames.

3. The image encoding device according to claim 1, wherein the attribute information includes information regarding a difference of the attributes between the coded partial attribute video frames.

4. The image encoding device according to claim 1, wherein the circuitry is further configured to code a first video sequence of the first attribute and a second video sequence of the second attribute separately.

5. The image encoding device according to claim 1, wherein
   the viewpoints further include a third viewpoint corresponding to a third attribute,
   the first attribute video frame of the first time includes the first attribute and the second attribute but excludes the third attribute,
   the second attribute video frame of the second time includes the second attribute and the third attribute but excludes the first attribute, and
   the circuitry is further configured to
      code the first attribute video frame and the second attribute video frame as one video sequence, and
      interleave, based on a reference relationship between the first attribute video frame and the second attribute video frame, the first attribute and the second attribute of first attribute video frame and the second attribute video frame.

6. The image encoding device according to claim 5, wherein the attribute information includes a parameter indicating an interval for the interleave.

7. The image encoding device according to claim 1, wherein each of the first attribute and the second attribute indicates a texture of the 3D object.

8. An image encoding method comprising:
   acquiring 3D data corresponding to a 3D object, wherein
      the 3D data is expressed with a plurality of attributes each corresponding to a single geometry of the 3D object,
      the attributes include a first attribute and a second attribute, and
      viewpoints include a first viewpoint at a first time and a second viewpoint at a second time;
   acquiring instruction information indicating a rendering path from the first time to the second time;
   generating, based on the rendering path, partial attribute video frames including a first attribute video frame of the first time that includes the first attribute and the second attribute, and a second attribute video frame of the second time that includes the second attribute but excludes the first attribute;

coding the partial attribute video frames; and generating attribute information indicating whether each of the first attribute and the second attribute is included in the coded partial attribute video frames at the first time, and whether each of the first attribute and the second attribute is included in the coded partial attribute video frames at the second time.

* * * * *